(12) United States Patent
Starkey et al.

(10) Patent No.: US 12,590,626 B2
(45) Date of Patent: Mar. 31, 2026

(54) SIVRT GEARTRAIN

(71) Applicants: Michael Lee Starkey, Canyon, TX (US); Robert E. Arnot, Albuquerque, NM (US)

(72) Inventors: Michael Lee Starkey, Canyon, TX (US); Robert E. Arnot, Albuquerque, NM (US)

(73) Assignee: Michael Lee Starkey, Canyon, TX (US)

( * ) Notice: Subject to any disclaimer, the term of this patent is extended or adjusted under 35 U.S.C. 154(b) by 0 days.

(21) Appl. No.: 19/233,202

(22) Filed: Jun. 10, 2025

(65) Prior Publication Data

US 2025/0297674 A1    Sep. 25, 2025

Related U.S. Application Data

(63) Continuation-in-part of application No. 16/095,679, filed as application No. PCT/US2017/029025 on Apr. 23, 2017, now Pat. No. 12,352,339.

(60) Provisional application No. 62/327,145, filed on Apr. 25, 2016.

(51) Int. Cl.
| | |
|---|---|
| *F16H 47/08* | (2006.01) |
| *F16H 37/04* | (2006.01) |
| *F16H 47/10* | (2006.01) |

(52) U.S. Cl.
CPC ......... *F16H 47/085* (2013.01); *F16H 37/041* (2013.01); *F16H 47/10* (2013.01); *F16H 2200/2007* (2013.01)

(58) Field of Classification Search
CPC ..... F16H 2200/0004; F16H 2200/2007; F16H 2200/201; F16H 47/00–12; F16H 37/04–0833
See application file for complete search history.

(56) References Cited

U.S. PATENT DOCUMENTS

| | | | |
|---|---|---|---|
| 2,198,398 A | 4/1940 | Szekely |
| 2,842,011 A | 7/1958 | Skowron |
| 2,949,793 A | 8/1960 | Suri |
| 2,973,669 A | 3/1961 | Quigley |
| 3,079,813 A | 3/1963 | Quigley |

(Continued)

OTHER PUBLICATIONS

International Search Report and Written Opinion by the US Patent and Trademark Office for PCT/US2017/029025 dated Jul. 7, 2017, 7 pp.

*Primary Examiner* — James J Taylor, II

(74) *Attorney, Agent, or Firm* — Daniel J. Chalker; Edwin S. Flores; Chalker Flores, LLP

(57) ABSTRACT

A geartrain includes a first planetary carrier supported on a input shaft, wherein the first planetary carrier has two or more first planetary gears that engage a first sun gear supported on a first intermediate shaft. A first ring gear engages the two or more first planetary gears and a first stationary gear supported on a first auxiliary shaft. A first gear is supported on the first intermediate shaft. A second gear is supported on a second intermediate shaft that engages the first gear. A third gear is supported on a second auxiliary shaft that engages the second gear. A second planetary carrier is supported on an output shaft, wherein the second planetary carrier has two or more second planetary gears that engage a second sun gear) supported on the first intermediate shaft. A second ring gear engages the two or more second planetary gears and a second stationary gear supported on the first auxiliary shaft.

28 Claims, 9 Drawing Sheets

(56)  References Cited

U.S. PATENT DOCUMENTS

| | | | |
|---|---|---|---|
| 3,240,083 | A | 3/1966 | Stoddard |
| 3,397,597 | A | 8/1968 | Szekely |
| 3,447,400 | A | 6/1969 | Serniuk |
| 3,645,152 | A | 2/1972 | Olcer |
| 4,637,275 | A | 1/1987 | Whalen |
| 4,833,942 | A | 5/1989 | Whalen |
| 5,222,921 | A | 6/1993 | Garcia |
| 5,259,823 | A | 11/1993 | Coronel |
| 5,512,021 | A | 4/1996 | Shash |
| 5,645,506 | A | 7/1997 | Mleczko |
| 6,135,909 | A | 10/2000 | Keiser |
| 7,824,290 | B1 | 11/2010 | Brookins |
| 8,241,162 | B2 | 8/2012 | Hiraki et al. |
| 8,790,203 | B2 | 7/2014 | Hehenberger |
| 9,453,566 | B2 | 9/2016 | Loeffler et al. |
| 9,657,822 | B2 | 5/2017 | Park |
| 10,082,194 | B2 | 9/2018 | Hehenberger |
| 10,670,120 | B2 | 6/2020 | Guzman |
| 2004/0048714 | A1 | 3/2004 | Phelan et al. |
| 2005/0071068 | A1 | 3/2005 | Funato et al. |
| 2013/0005524 | A1 | 1/2013 | Waugh |

*meshing gear 31b not visible

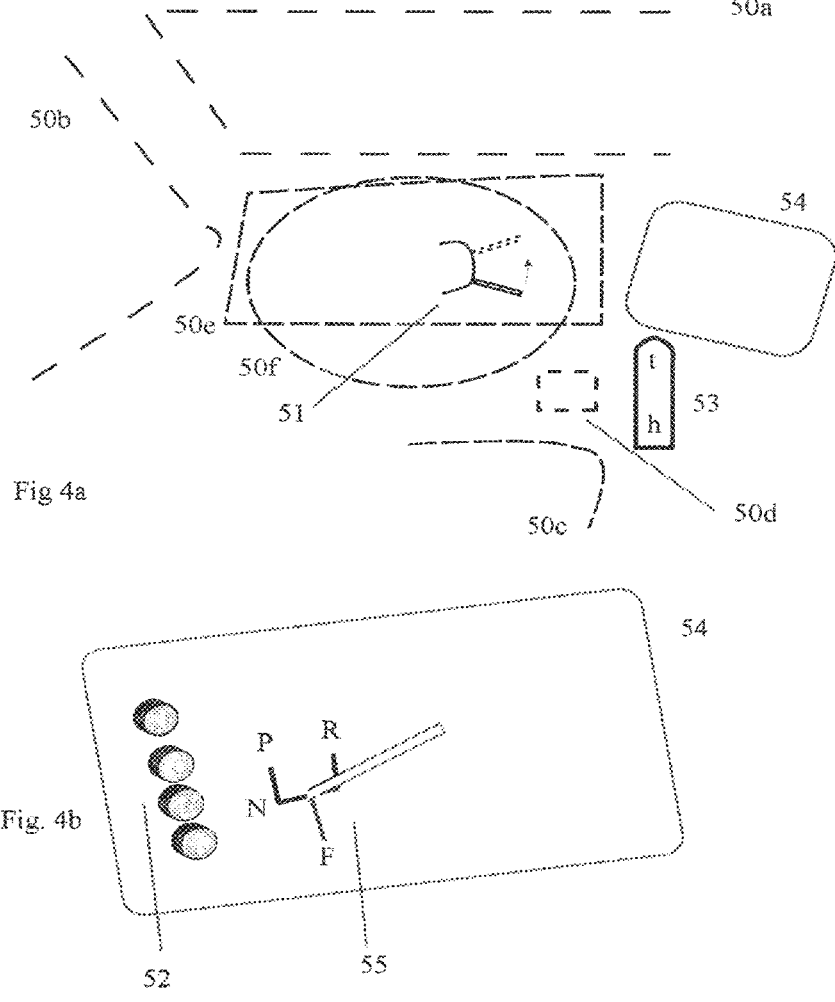
Fig 4a
Fig. 4b
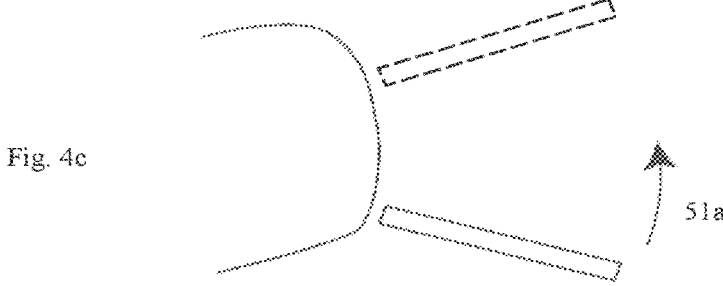
Fig. 4c

SIVRT GEARTRAIN

CROSS-REFERENCE TO RELATED APPLICATIONS

This application is a continuation-in-part application of U.S. patent application Ser. No. 16/095,679, filed Oct. 22, 2018, which claims priority to PCT/US17/29025, filed Apr. 23, 2017, which claims priority to U.S. Provisional Application 62/327,145, filed Apr. 25, 2016. All of the foregoing application are hereby included in their entirety by reference.

BACKGROUND OF THE INVENTION

Sophisticated robotic-automated vehicle transmissions with up to 10 forward speeds have been developed to comply with increasingly stringent fuel-economy and emissions rules enforced upon small autos to be sold for typical family use in USA. The technology for such gearboxes is improving, at least for low-power gasoline and electric-gasoline hybrids intended mainly for highway use (EPA Tier-3 driving schedules). There are now also N-speed automatic transmissions (N=more than 4) provided for emissions and fuel-economy compliant light trucks used for highway operation.

However, providing a robust, reliable, 10+ speed robotic-automatic transmission for trucks, especially for EPA-compliant, diesel-powered, vocational vehicles (Classes 4-8) which operate mainly at very low speeds and under continual stop-reverse-hold-start sequences is an entirely different engineering-design challenge. During the past several years, the many accounts of transmission breakdowns due to design oversights and some in-service catastrophes confirm that even the "strongest" versions of EPA-robo-auto transmissions (including CVT or DCT) are neither reliable nor cost-effective for such heavy-duty applications which involve mainly creeping speeds and repeated stop-start and stop-reverse operations.

Because the typical refuse truck has a portion of its daily route on highways and city streets at traveling at 10-25 m/sec, it is not practical to use hydrostatic transmissions as are utilized in robust off-road equipment such as skid loaders, backhoes and tractors. Compactor-bodies for refuse trucks are almost universally fitted to a std. cab-chassis including an automatic transmission which was never designed for the unique creep, stop, reverse, start operation of a trash route; thus, it comes as no surprise that transmission failures are an expensive and frequent problem.

SUMMARY OF THE INVENTION

The SIVRT invention disclosed herein is an advanced speed-, environment- and power-scalable mechanical transmission which transfers input torque and rotation velocity, respectively as provided from a defined source, to a particular output-object by means of an advanced geartrain with torque feedback controls which provides a continuous, not stepped, selection range of output shaft-rotation velocities within specific defined upper and lower values. This transmission includes unique, rationalized operator controls especially adapted for various types of engine-powered working machines which operate mainly at or below creeping speeds and are also subject to repeated stop-forward-stop-reverse-stop events under full load.

The invention disclosed is the result of careful analysis of failure modes of typical, commercial automatic transmissions in EPA-compliant, standard-production trucks subject to repeated stop-start-reverse operations. The present invention has been tested by building a full-size working model and making a 3D CAD model of individual parts and resulting actual working assemblies. These new analytical results and precise measurements formed the original starting point for rethinking transmission science and engineering optimization of the several functions critical to stop-start-reverse performance. This project has led to the SIVRT embodiments scaled for particular power, gear ratios and duty cycles. These new power-transfer-geartrain mechanisms convert available torque at a preferred RPM (for a particular prime mover) into a continuous, non-interrupted, stepless series of torque outputs over a wide range of output-shaft rotation speeds.

Elimination of (electro-) and mechanical clutches, which are the main failure mode of automatic truck transmissions, solves the problem. The SIVRT is a "clutch-free", durable, cost-effective, direct replacement for various commercial versions of automatic and robotic CVT transmissions. The present veriformer transmission accomplishes torque transfer to the output shaft continuously over a range of gear ratios; the operator is not required to use a classic foot clutch mechanism and traditional shift lever to shift from forward to reverse gears or to shift 4 to 10 times from "creeping" gears to low to highway gear.

The variformer transmission is adaptable to specific applications (power, torque, ratio, duty cycles-patterns, environmental considerations, specific cost/weight limits, noise-vibration limits and the probable service life etc.) by scaling of the model characteristics as shown in Table 1. These factors include: (a) the overall gear ratio available between input and output (either direction), (b) tooth profile, especially within in the meshing zone, (c) tooth face width and (d) gearwheel materials/mechanical properties/tooth-surface finish/tooth-surface treatments, etc. Adaptation scaling and customization from the present design model is done using known design and modeling software such as KISSsoft, LISP, MatLab and Gleason in conformance with international standards-practices such as AGMA, ISO, DIN, JIS in either US popular units or SI-metric units.

SIVRT variformer embodiments adapted to small working machines or to large vocational trucks can offer a wide range of overall forward and/or reverse speed ratios (input shaft A or AA: output shaft E, in forward OR reverse). According to std. engineering practice, the overall ratio of a geartrain is always stated as a number greater than 1, whichever of torque or velocity is >1, regardless of the direction of power flow; for the SIVRT, the range is about 1,000 (creeping) up to about 2 (highway speeds).

The SIVRT variformer geartrain includes three advanced features: (a) a VariGyro assembly for stepless engagement of any desired gear ratio within the range of the mechanisms, (b) two VariSpeed torque feedback systems to provide a wide range of selectable gear ratios within the geartrain and (c) a user-friendly VariSafe operator interface to accomplish arming, activating, managing the VariSpeed subassembly to achieve the particular desired ratio with maximum control over the various engine and transmission functions. An inherent safety feature of the latter is full-time, operator-friendly display of the status of the several variformer controls.

One embodiment of the present invention provides a geartrain that includes an input shaft, an output shaft, a first intermediate shaft, a second intermediate shaft, a first auxiliary shaft, and a second auxiliary shaft. A first planetary carrier is supported on the input shaft, wherein the first planetary carrier has two or more first planetary gears that engage a first sun gear supported on the first intermediate shaft. A first ring gear engages the two or more first planetary gears and a first stationary gear supported on the first auxiliary shaft. A first gear is supported on the first intermediate shaft. A second gear is supported on the second intermediate shaft that engages the first gear. A third gear is supported on the second auxiliary shaft that engages the second gear. A second planetary carrier is supported on the output shaft, wherein the second planetary carrier has two or more second planetary gears that engage a second sun gear supported on the first intermediate shaft. A second ring gear (115) engages the two or more second planetary gears and a second stationary gear supported on the first auxiliary shaft.

In one aspect, the first ring gear is larger than the second ring gear (115). In another aspect, a first fluid-coupled-gearset is coupled to the first auxiliary shaft, a second fluid-coupled-gearset is coupled to the second auxiliary shaft, and the first and second fluid-coupled-gearsets control an output gear ratio of the output shaft to the input shaft and a rotational direction of the output shaft. In another aspect, the geartrain operates in a neutral setting when no torque feedback is supplied by the first and second fluid-coupled-gearsets, a forward setting when a torque feedback is supplied by the first fluid-coupled-gearset, and a reverse setting when the torque feedback is supplied by the second fluid-coupled-gearset. In another aspect, an operator interface is coupled to the geartrain that stops, starts or reverses the geartrain. In another aspect, the geartrain does not include a band-clutch or a disc-clutch. In another aspect, a power source is coupled to the input shaft.

Another embodiment of the present invention provides a method of operating a geartrain by providing the geartrain described above, the geartrain further comprising a first fluid-coupled-gearset coupled to the first auxiliary shaft and a second fluid-coupled-gearset coupled to the second auxiliary shaft. The output shaft is turned in a same direction of the input shaft by activating the first fluid-coupled-gearset and inactivating the second fluid-coupled-gearset. The output shaft is turned in an opposite direction of the input shaft by inactivating the first fluid-coupled-gearset and activating the second fluid-coupled-gearset. The output shaft is neutralized by inactivating the first fluid-coupled-gearset and inactivating the second fluid-coupled-gearset.

In one aspect, the first ring gear is larger than the second ring gear (115). In another aspect, an operator interface coupled to the geartrain that stops, starts or reverses the geartrain. In another aspect, the geartrain does not include a band-clutch or a disc-clutch. In another aspect, a power source is coupled to the input shaft.

In another embodiment of the present invention, a geartrain system (550) includes a first geartrain, a second geartrain and a power source. The first geartrain and the second geartrain each include: an input shaft, an output shaft, a first intermediate shaft, a second intermediate shaft, a first auxiliary shaft, and a second auxiliary shaft. A first planetary carrier is supported on the input shaft, wherein the first planetary carrier has two or more first planetary gears that engage a first sun gear supported on the first intermediate shaft. A first ring gear engages the two or more first planetary gears and a first stationary gear supported on the first auxiliary shaft. A first gear is supported on the first intermediate shaft. A second gear is supported on the second intermediate shaft that engages the first gear. A third gear is supported on the second auxiliary shaft that engages the second gear. A second planetary carrier is supported on the output shaft, wherein the second planetary carrier has two or more second planetary gears that engage a second sun gear supported on the first intermediate shaft. A second ring gear (115) engages the two or more second planetary gears and a second stationary gear supported on the first auxiliary shaft. The power source is coupled to the input shaft of the first geartrain and the input shaft of the second geartrain.

In one aspect, the first ring gear is larger than the second ring gear (115). In another aspect, a first fluid-coupled-gearset is coupled to the first auxiliary shaft of the first geartrain and the second geartrain, a second fluid-coupled-gearset is coupled to the second auxiliary shaft of the first geartrain and the second geartrain, and the first and second fluid-coupled-gearsets control an output gear ratio of the output shaft to the input shaft) of the first geartrain and the second geartrain and a rotational direction of the output shaft of the first geartrain and the second geartrain. In another aspect, the geartrain system operates in: a neutral setting when no torque feedback is supplied by the first and second fluid-coupled-gearsets, a forward setting when a torque feedback is supplied by the first fluid-coupled-gearset, and a reverse setting when the torque feedback is supplied by the second fluid-coupled-gearset. In another aspect, a first fluid-coupled-gearset is coupled to the first auxiliary shaft of the first geartrain, a second fluid-coupled-gearset is coupled to the second auxiliary shaft of the first geartrain, a third fluid-coupled-gearset is coupled to the first auxiliary shaft of the second geartrain, a fourth fluid-coupled-gearset is coupled to the second auxiliary shaft of the second geartrain, the first and second fluid-coupled-gearsets control an output gear ratio of the output shaft to the input shaft of the first geartrain and a rotational direction of the output shaft of the first geartrain, and the third and fourth fluid-coupled-gearsets (FCG3, FCG4) control an output gear ratio of the output shaft to the input shaft of the second geartrain and a rotational direction of the output shaft of the second geartrain. In another aspect, the first geartrain operates in a neutral setting when no torque feedback is supplied by the first and second fluid-coupled-gearsets, a forward setting when a torque feedback is supplied by the first fluid-coupled-gearset, and a reverse setting when the torque feedback is supplied by the second fluid-coupled-gearset, and the second geartrain operates in the neutral setting when no torque feedback is supplied by the third and fourth fluid-coupled-gearsets (FCG3, FCG4), the forward setting when the torque feedback is supplied by the third fluid-coupled-gearset, and the reverse setting when the torque feedback is supplied by the fourth fluid-coupled-gearset. In another aspect, an operator interface is coupled to the geartrain that stops, starts or reverses the geartrain system. In another aspect, the geartrain system does not include a band-clutch or a disc-clutch.

Another embodiment of the present invention provides a method of operating a geartrain system by providing the geartrain system described above, the first geartrain and the second geartrain further comprising a first fluid-coupled-gearset coupled to the first auxiliary shaft and a second fluid-coupled-gearset coupled to the second auxiliary shaft. The output shafts of the first geartrain and the second geartrain turn in a same direction of the input shaft by activating the first fluid-coupled-gearset and inactivating the second fluid-coupled-gearset. The output shafts of the first geartrain and the second geartrain turn in an opposite direction of the input shaft by inactivating the first fluid-coupled-gearset and activating the second fluid-coupled-gearset. The output shafts of the first geartrain and the second geartrain are neutralized by inactivating the first fluid-coupled-gearset and inactivating the second fluid-coupled-gearset.

In one aspect, the first ring gear is larger than the second ring gear (115). In another aspect, an operator interface is coupled to the first geartrain and second geartrain that stops, starts or reverses the geartrain system. In another aspect, the geartrain system does not include a band-clutch or a disc-clutch.

Another embodiment of the present invention provides a method of operating a geartrain system that includes providing the geartrain system described above, further comprising a first fluid-coupled-gearset coupled to the first auxiliary shaft of the first geartrain, a second fluid-coupled-gearset coupled to the second auxiliary shaft of the first geartrain, a third fluid-coupled-gearset coupled to the first auxiliary shaft of the second geartrain, and a fourth fluid-coupled-gearset coupled to the second auxiliary shaft of the second geartrain. The output shaft turns in a same direction of the input shaft of the first geartrain by activating the first fluid-coupled-gearset and inactivating the second fluid-coupled-gearset. The output shaft turns in an opposite direction of the input shaft of the first geartrain by inactivating the first fluid-coupled-gearset and activating the second fluid-coupled-gearset. The output shaft of the first geartrain is neutralized by inactivating the first fluid-coupled-gearset and inactivating the second fluid-coupled-gearset. The output shaft turns in a same direction of the input shaft of the second geartrain by activating the third fluid-coupled-gearset and inactivating the fourth fluid-coupled-gearset. The output shaft turns in an opposite direction of the input shaft of the second geartrain by inactivating the third fluid-coupled-gearset and activating the fourth fluid-coupled-gearset. The output shaft of the second geartrain is neutralized by inactivating the third fluid-coupled-gearset and inactivating the fourth fluid-coupled-gearset.

In one aspect, the first ring gear is larger than the second ring gear (115). In another aspect, an operator interface is coupled to the first geartrain and second geartrain that stops, starts or reverses the geartrain system. In another aspect, the geartrain system does not include a band-clutch or a disc-clutch.

In addition to the foregoing, various other methods, systems, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein

BRIEF DESCRIPTION OF THE DRAWINGS

For a more complete understanding of the features and advantages of the present invention, reference is now made to the detailed description of the invention along with the accompanying figures, in which:

In FIG. 1c, only idler 18a, which is supported on shaft J1, is shown. For clarity only two planet gears, 14a and 14b, are shown in FIG. 1c; both are supported by carrier PC which is fixed to output shaft E and meshes with 15 and 13. However, there may be 3-6 planet gears, designated 14c, 14d, 14e and 14f in exemplary alternative embodiments. Shafts F and G drive ratio-control elements described in FIG. 1d.

FIG. 4a Oblique VariSafe Cab View This figure shows the cab layout of: (a) stalk throttle=VariRPM, (b) fingertip interface=VariPanel and (c) speed pedal=VariPedal in a typical left-hand-drive (LHD) vocational truck. The viewpoint for this schematic is approximately perpendicular to the surface of the pivoting VariPedal. This sketch illustrates advanced VariSafe controls (51) to (55) as installed in a typical standard truck cab; dashed lines depict outlines of standard cab features such as windshield, driver-side door-window, steering wheel, seat edge, and normal service brake pedal. Ideally, the replaced controls, i.e., the classic accelerator pedal, gear-selector stick (auto or manual transmission) and certain dash displays/warnings along with other unnecessary old controls/displays are eliminated.

FIG. 4b Oblique View of Fingertip Interface This figure shows the VariMode selector and its Y-form pattern on the VariPanel. This figure also shows the VariRange control embodied as a vertical-stack array of lighted push buttons which provide a selected number of available options and displays current-selected status.

FIG. 4c Oblique View of Stalk Control of Input Power This figure shows the VariRPM in an alternative positioning on the right-hand side of the steering column with an angle range (51a) of about 120 deg.

DETAILED DESCRIPTION OF THE INVENTION

Figures 1A, 1B:
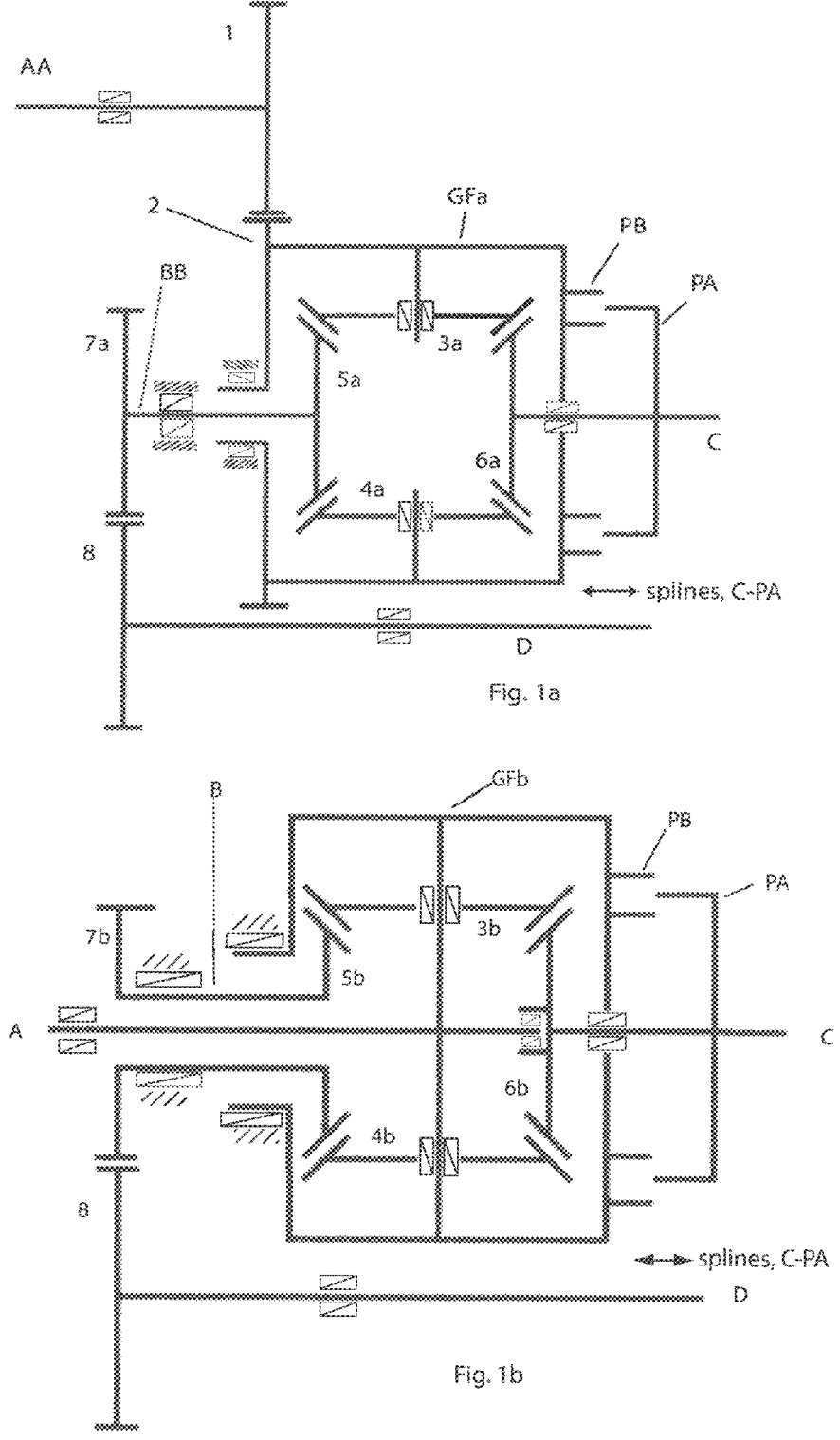
FIG. 1a is a schematic representation of a first alternative input portion of the variformer, and the VariGyro in this alternative includes gear 1. Shaft AA is the input from the power source, typically a truck or vehicle engine; most engines comply with SAE J824, i.e., output rotation is CCW as viewed from output end of crankshaft (flywheel). This subassembly includes gear 2 which drives rotation of the gyro-frame housing, GFa; the latter supports bevel gears 3a and 4a, which, in turn, drive bevel gears 5a, shaft BB, bevel gear 6a and shaft C. PA and PB are mating halves of the coupling which is actuated by sliding PA laterally along splined portion of C and into locking engagement with PB; in this state shaft C, GFa and gear 2 are locked together thus locking shaft BB to C; this also locks shaft E, i.e. "park" is engaged. As indicated, gear 2 includes a concentric, tubular shaft extension which is supported independently on bearings and rotates around BB.
FIG. 1b is a schematic representation of a second alternative input portion of the variformer, and the VariGyro; this alternative embodiment illustrates input A which drives rotation of the gyro-frame housing, GFb. The latter supports bevel gears 3b and 4b, which, in turn, drive bevel gear 5b, shaft B, gear 6b and shaft C. PA and PB are mating halves of the coupling which is actuated by sliding PA laterally along the splined portion of C and into locking engagement with PB; in this state shaft C, GFb and shaft B are locked together; this also locks shaft E, i.e. "park" is engaged. As indicated, gear 7b is fixed to gear 5b and supported on concentric tubular shaft B by independent bearings. The distal end of A is supported on bearings supported by gear 6b and shaft C.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Wordmarks

Certain unique coined words used in the following specification are claimed as wordmarks. To save space in this document, these words are used without the required superscript Identifier™. The designated words are: SIVRT, variform (-er, -ing), VariGyro, VariSpeed, VariSafe, VariLogic, VariRPM, VariRange, VariPedal, VariPanel and VariMode.

Special Terms

The SIVRT variformer transmission of the present invention uses an advanced-design geartrain including a non-reverted array of meshing gearsets supported on multiple countershafts within a housing enclosure. As used herein:

(a) the unique verb "variform" means mechanical conversion of input torque and angular velocity, without use of classic band- or disc-clutches, into a continuous series of output torque-velocities using a uniquely ordered combination of particular gearsets as may be found in typical mechanical transmissions (manual, automatic, CVT, other);

(b) the unique gerund "variforming" means torque-velocity conversion without use of friction clutches and particular-stepped-gear ratios typical of known mechanical transmissions (manual or automatic);

(c) the unique adjectival modifier "variformer" means a mechanism adapted to variform torque and capable of variforming torque over a wide range of speeds and torques; and (d) the noun "variformer" means an advanced power-transfer geartrain for a vehicle or working machine combined with ancillary torque feedback energy-interchange and ratio-control systems cooperating with connected operator inputs-controls. The latter includes programmable sequences of speeds-durations-location-zones and advanced safety interlocks to prevent truck-crew accidents and property damage.

Together, the elements of this system accomplish the function of continuous-seamless-stepless modulation of gear ratios to accomplish the transfer of power from a traditional IC engine operating at a predetermined efficient speed-load combination to vocational-vehicle drive wheels in service applications involving repeated stops/neutrals/starts-creeping/reverses, i.e., variforming operational modes. This geartrain does not involve known, complex planetary mechanisms and friction-type band-clutch controls such as those employed in state-of-the-art, reverted, 10-speed automatic transmissions.

The proprietary names of the following elements of the SIVRT are shortened in the following:

VariGyro (20) means the geartrains shown in FIGS. 1a and 1b and specified in Table 1. This subassembly of the present invention is the specialized geartrain designed for operation at full design-level of power AND under continual, substantial differences in rotational velocity between its pinion- and side-bevel gears. As used herein, VariGyro (20) means a bevel-gear subassembly supported on a robust gear-frame adapted to support the stresses of rotating at 100% duty cycle and full power and further provided with internal channels to deliver lubricant from a pressurized supply both to gear bearings and tooth faces. Because this subassembly is designed to operate much of the time with one toothed wheel of its array restrained by the control system, it is profoundly different in basic concept and actual function from traditional drive-axle spider gears in a truck differential. In contrast to a simple drive axle gearset designed to power to both wheels of a light vehicle rotating at the same velocity (except for the few meters of turning during hundreds of km traveled straight ahead), both the kinetics (dynamic forces) and the kinematics (geometric motions) of the VariGyro toothwheels and housing have been optimized by working models and careful modeling of stresses and tribology-friction. This modeling-analysis has also enabled visualization of unanticipated backlash and vibration as well as providing significant guidance toward reduction of lubricant churning and fluid-friction processes.

Design of bearings and supporting lubricant-delivery systems for the critical VariGyro gears operating continually at high speed-load requires careful analysis to provide: sufficient flow rates/pressures of effective-stable fluid lubricants suited to fit-up tolerances of the particular anti-friction elements, the separation and thrust loads related to helical-and-bevel gearing as well as to provide localized cooling of the components by a regulated flow of lubricant within a predetermined temperature range.

Figure 1C:
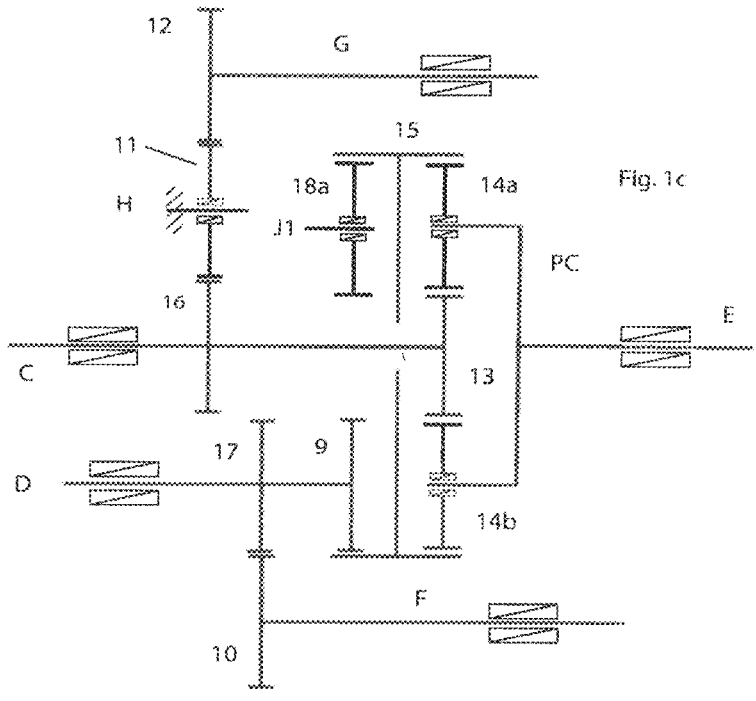
FIG. 1c is a schematic representation of the output portion of the variformer, and the VariSpeed subassembly. This assemblage receives rotational inputs from shafts C and D. Shaft C is fixed to and drives gears 13 and 16. Shaft D is fixed to and drives gears 9 and 17. Internal ring gear 15 is driven by gear 9 on shaft D and supported for the resulting rotation by an array of n idler gears, 18a to 18n, where n is a number in the range 3-6.
Figure 1D:
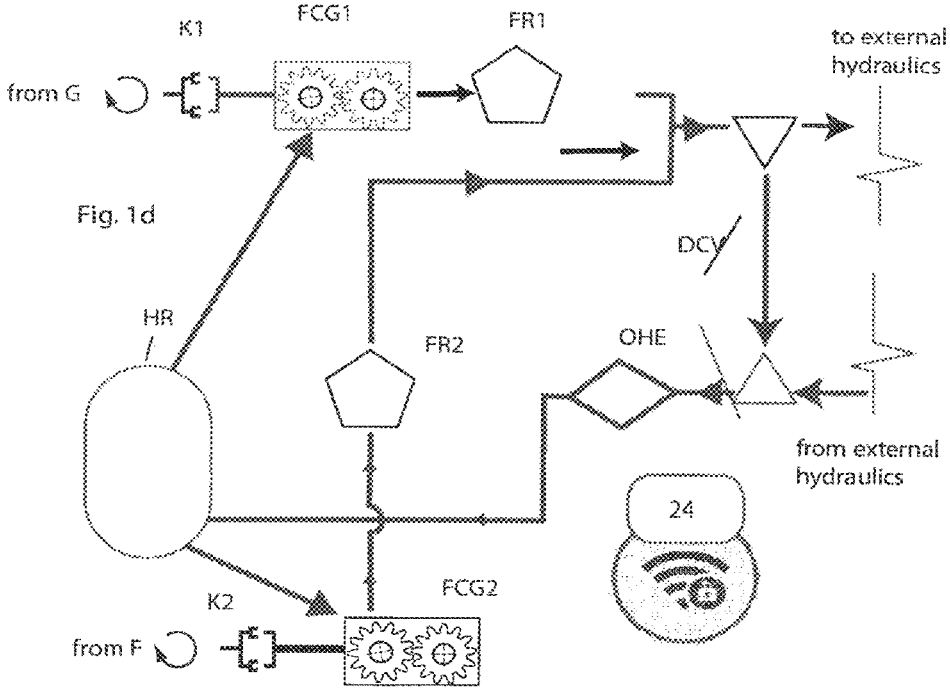
FIG. 1d is a schematic representation of the integrated control mechanisms underlying the operator-interface portion of the variformer and the VariSafe subassembly. The two torque feedback elements, Fluid-Coupled Gearsets FCG1 and FCG2, provide resistive rotational torques to control the VariSpeed components and thus the output gear ratio of shaft E to input shaft A or AA. The two fluid-coupled gearsets (FCG), function to circulate hydraulic fluid from a reservoir (HR) and into the two control circuits shown; each circuit is provided with a Fluid-Resistance element (FR), which is variable and under the operator's control. VariSafe operator controls are adapted to provide variable volumetric flow resistance to FCG1 and FCG2 by means of the two connected variable elements FR1 and FR2.
Figures 2A, 2B:
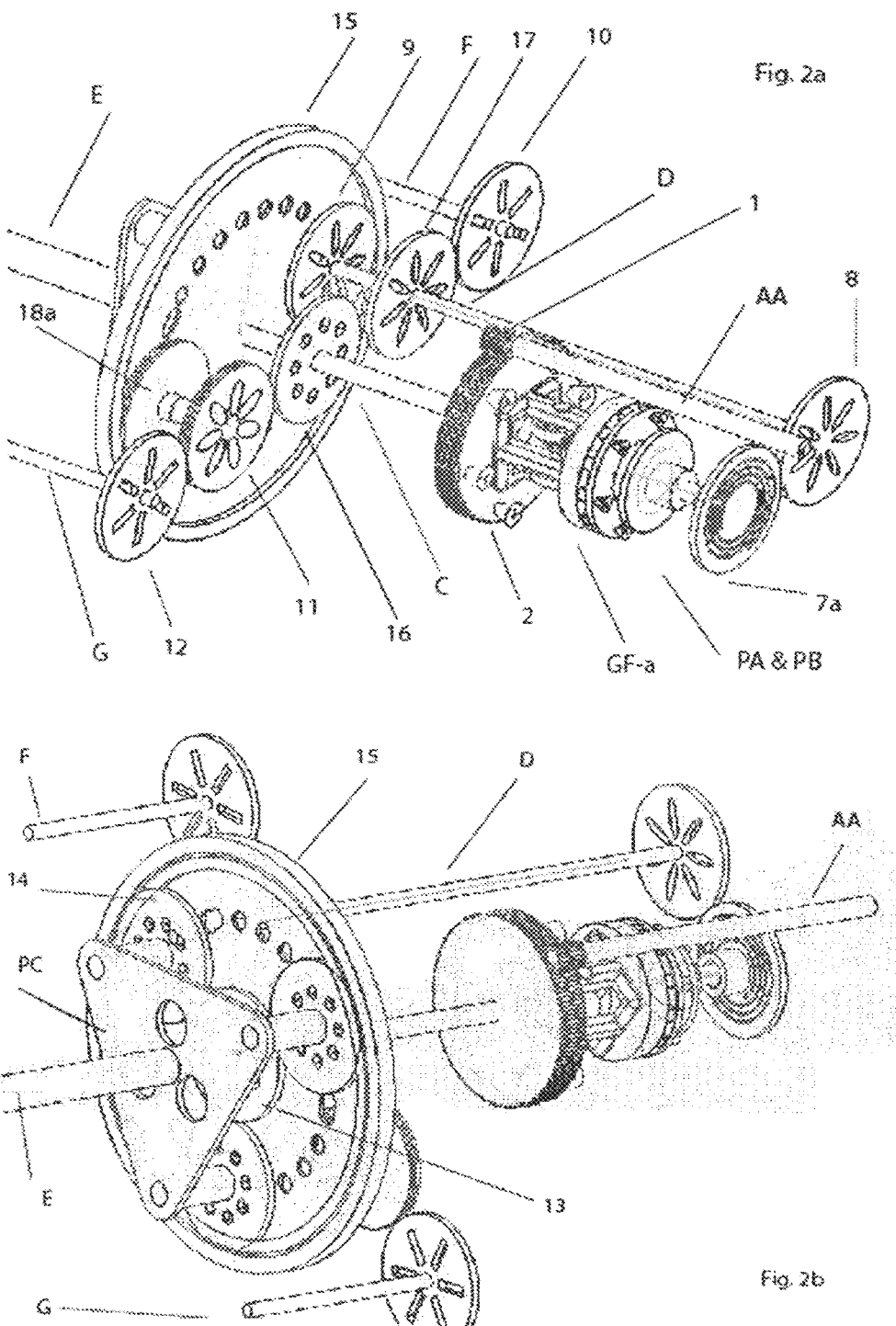
FIG. 2a is a view of the 3D CAD model of the variformer taken oblique to the axis of shaft C looking from the input aspect; it shows the VariGyro and VariSpeed subassemblies. This model was prepared to confirm pitch circles, shaft spacings and other design details of the present invention. All the major mechanical elements are indicated; this model is similar to FIG. 1a with input AA.
FIG. 2b is a view of the 3D CAD model of the variformer taken oblique to the axis of shaft E looking from the output aspect; it shows the VariGyro and VariSpeed subassemblies. CAD models are important to confirm pitch circles, shaft spacings and other design details of the present invention. This model is similar to FIG. 1a with input AA; CAD simulation in software such as KISSsoft is used to optimize bearing design and placement of the counter-shafts for alternative embodiments.
Figure 2D:
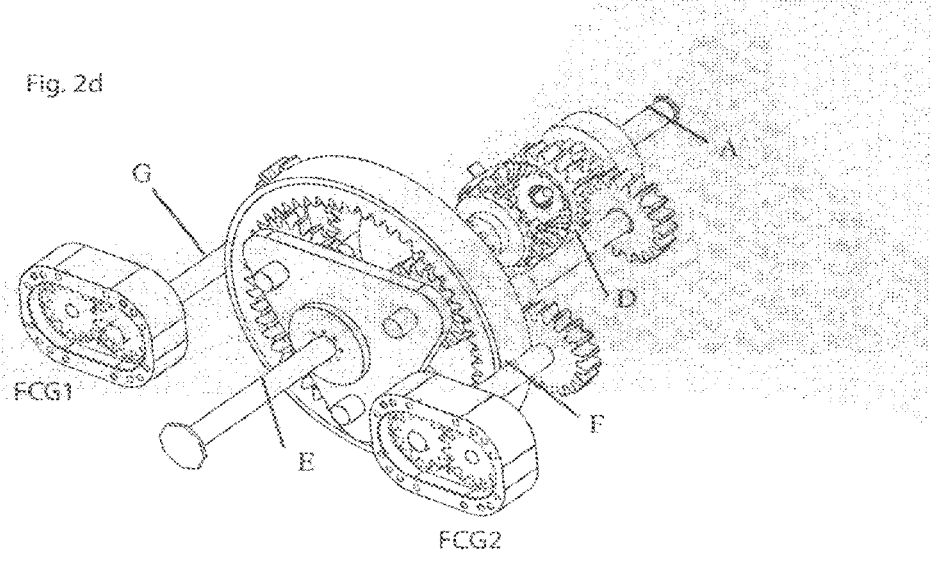
FIG. 2d is a view of the same 3D CAD model of FIG. 2c showing the variformer from an output aspect oblique to the axis of shaft E; it shows the VariGyro and VariSpeed subassemblies along with FCG1 and FCG2; this model is similar to FIG. 1b with input A.
Figure 2C:
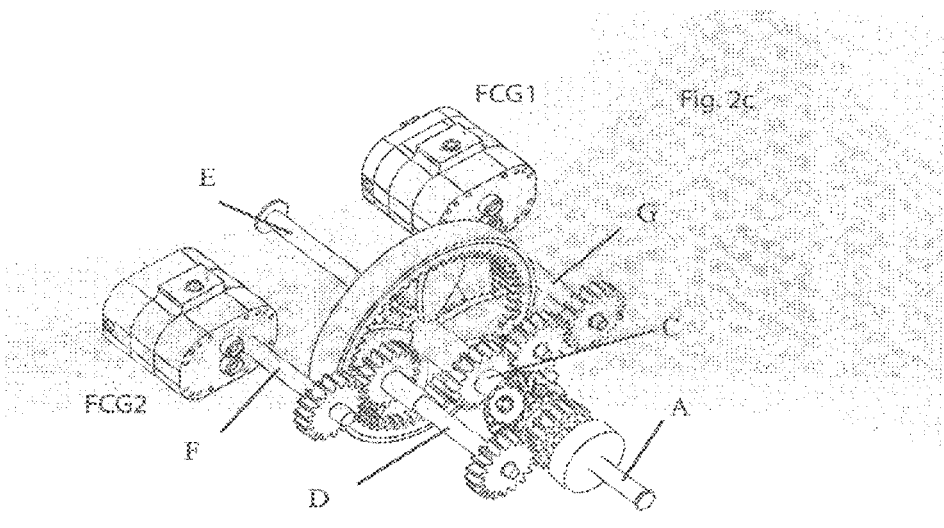
FIG. 2c is a view of another 3D CAD model of the variformer geartrain taken oblique to the axis of shaft C looking from the input aspect; it shows the VariGyro and VariSpeed subassemblies along with FCG1 and FCG2. To show the VariGyro clearly, the following features are not shown: GFa, GFb, splines on shaft C for PA lateral movements and gear 9; this model is similar to FIG. 1b with input A.
Figure 2E:
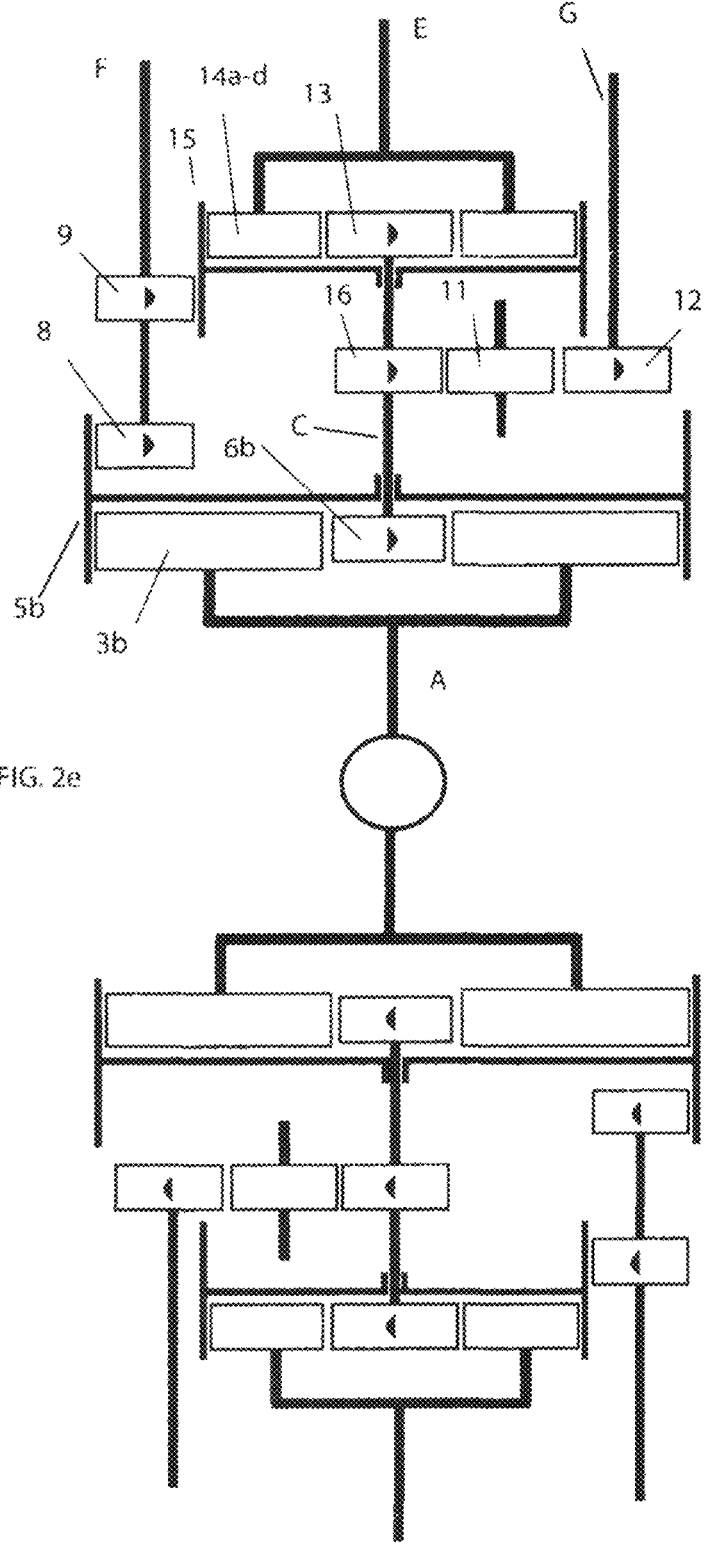
FIG. 2e. Schematic of dual-SIVRT embodiment. In this embodiment two transmissions are adapted to one particular engine and coordinated by driver to actuate right and left wheels tracks of a working machine independently or to drive its front and rear drive axles wheels independently.

VariSpeed (21) means the geartrains shown in FIGS. 1e and 1d and specified in Table 1. As used herein, VariSpeed means the combination of two subassemblies which control the variformer; these elements consist of two integrated torque feedback circuits which exert mechanical-control torques on shafts F and G and thereby alter the rotation-direction and speed-ratio between the input shaft (A or AA) and output shaft E. Direct operator commands are provided to valves FR1 and FR2 which in turn adjust the volumetric flow rate and flow resistance of the torque feedback circuits. Alternative embodiments may also incorporate a sequence of predetermined time-x-power stages defined by one or more timely, prompted inputs from the operator. The VariSpeed element includes a rotating, two-sided planetary gear, 4 planet gears, a sun gear; the planet carrier drives the output shaft E. Two shafts, F and G, of the "variforming" transmission are provided with mechanical-torque inputs regulated by either: predetermined control algorithms for a sequence of actions, OR by instantaneous-direct manual commands from the operator.

The VariSpeed subassembly is connected to the VariGyro outputs by shafts C and D which drive gears 16-11-12-13 and 17-9-10 respectively. If resistive feedback torque is applied to shaft G by an operator command, its rate of free rotation in the default direction will be reduced; this reduces the rate of rotation of shaft C and gear 13. The variformer will adapt to this reduction by increasing the rotation rate of shaft D and gear 9; this causes a correlated increase in the rate of gear 15. The resulting speed differential between gears 13 and 15 will drive PC and output shaft E to rotate in the opposite direction to that of the specific GF, i.e., either GFa or GFb and at a ratio responsive to the particular level of resistive torque feedback applied.

Figure 3:
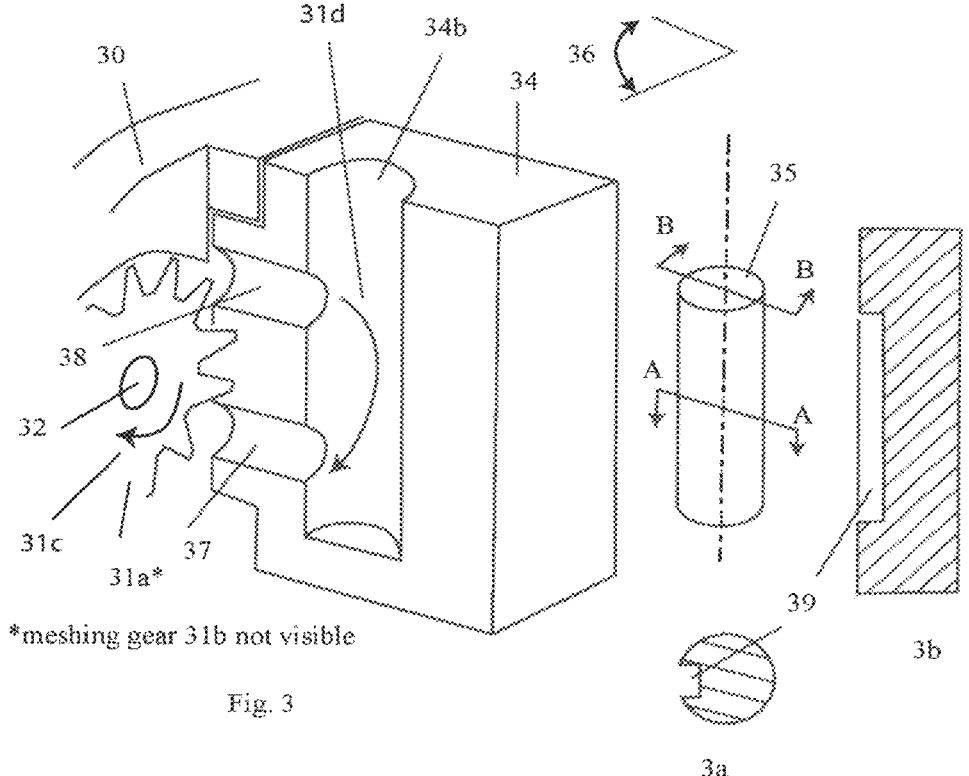
FIG. 3 is a sectional cut-away view of the components of a fluid-coupled gearset, such as FCG1 or FCG2, connected to, and providing feedback torque to one of, shaft F or G respectively. In this view the internal portion of the plug is shown displaced from its location in the housing cover and shown to one side thereof. When the particular gearset is inactive, the plug is oriented in the open state as shown; this allows fluid to bypass the resistance element in that circuit and flow back into the fluid-inlet zone of the gearset. The known mechanical actuators, which are mounted and configured to rotate the plugs over arc (36) after sensing an operator command, are not shown. The purpose of the fluid bypass is to reduce the lost work done by the inactive FCG. Views 3a and 3b are sectional views of the plug showing the size, location and proportions of the channel.

Fluid-Coupled Gearsets: FIG. 3 is a cut-away schematic of the housing and cover showing functional details for the two identical FCGs. The main elements are: (30)—FCG housing body; (31a)—FCG driven gear [the identical meshing idler gear, (31b), cannot be seen in this cut-away view]; (32)—gear-driving shaft, F or G; (31c)—shaft+ gear rotation direction; (34)—FCG housing cover; (34b)—plug cavity in cover; (35)—internal portion of bypass plug; (36)—plug exterior-portion rotation arc ~90 deg; (37)—bypass outlet channel; (38)—bypass inlet channel; (39)—bypass flow slot in plug.

The cylindrical plug portion (35) is: (a) rotatable about its axis over an arc (36) of about 90 deg between its open and closed orientations, (b) the plug portion which extends outside the cover is driven by a connected, adjacent mechanical link and actuated on the basis of an operator command to variformer controls and (c) sealingly fitted into the cover (34). In the open orientation, (39) connects (37) and (38) to allow flow; in the closed orientation there is no flow connection there between. The transverse flow area of the rectangular slot (39) in its open state is comparable to the circular flow areas of (37) and (38); the transverse flow area of all bypass portions is approximately the 0.75× (addendum+dedendum, in mm)$^2$ of the driven gear (31) teeth. The rotation direction of the driven gear is shown by (31$c$) and the bypass fluid flow direction is shown by (31$d$). The dimensional characteristics of the driven (31$a$) and idler (31$b$) gears are: 35<pitch diam, mm<300; 3<module, mm<5; and 20<face width, mm<50; channels (37) and (38) are spaced apart in the cover and sufficiently positioned relative to length of action of the meshing gear teeth so that fluid flows from the zone of higher pressure to the domain of lower pressure when the plug is open. The plug actuator, which is a known digital servo motor, is mounted external to the variformer and not shown; it is coupled and coordinated to open the bypass of the inactive FCG simultaneously with closing of the bypass on the active FCG, upon operator command.

FR Pressure Control in Flow Circuit. The active FCG draws known liquid hydraulic fluid (chosen for specific characteristics including viscosity, density, boiling point, chemical-thermal stability, etc.) at low pressure from the reservoir and outputs working fluid under high pressure to either:

(a) a variable-fluid-resistance energy conversion/storage system, i.e., a known fluid-powered electromagnetic generator connected to a known electrical-storage device and controlled by an integrated energy-management module regulated by operator inputs; or (b) a variable-fluid-resistance-throttling device, i.e., a precision mechanical needle valve actuated by operator inputs to VariSafe controls. The fluid discharge line from the valves may also be fitted with a heat exchanger to provide optional fluid cooling during its return to the fluid reservoir.

While in stationary operation with the engine providing input power, shafts F and G each (respectively) receives minimal mechanical feedback (=are free to rotate) when the respective flow-resistance device, FR1 or FR2, is in the full-open state. When one discharge port is completely closed, the related shaft does not rotate. In such a closed state, the pressurizing system will generate heat in the pressurized fluid and a controlled, small reflux flow is allowed to circulate through the heat exchanger where the excess heat is rejected to the environment and the fluid returned to the reservoir. With the discharge port in a partially open state, the torque applied to the related shaft is variable according to operator inputs, and working together, the control valves result in precise regulation of both the output shaft rotational speed and direction.

Couplings K1, K2 are known types of shaft couplings which transfer power, allow for optional decoupling and tolerate misalignment including HRC, gear, chain, universal, pin, spline, and taper locks.

Fluid Resistance (FR) Elements for Speed Control. An operator command for selection of travel direction, i.e., forward or reverse, drives one of the FR components of the VariSpeed subassembly to increase its flow resistance; see FIG. 1$d$. In these figures known FR devices are indicated only schematically.

FR Commands. The detailed arguments of such a command also delimit the desired speed and whether the operator may also have continuing, real-time incremental-trim control (foot-pedal or manual device) of the selected level of speed and the resulting vehicle speed range. Optionally, a preset duration-limit for time and/or travel-distance for the new setting may also be added by operator inputs. Fluid resistance and speed control are added by removing p$\Delta$V work from the active fluid circuit. This is accomplished by throttling the flow by a nozzle-and-spray chamber or by engaging a connected fluid-motor load; either/both alternative method(s) may be utilized for fluid-resistance modulation in the present invention. The FR symbol indicates an assembly of known, interconnected components for either alternative.

Operator commands for throttling are accomplished by several known alternative flow-resistance devices such as a digital-servo needle valve for a continuous, multi-turn range of $\Delta p$ values or a rationally-staged series of selectable orifices of particular bores. The angular velocity of shaft E is controlled by the $\Delta p$ available to the active FCG from its FR device.

Operator commands for increasing resistance by extraction of useful work from the active circuit are accomplished providing the following arguments: desired speed in m/sec and where to store the extracted work. In this mode, the work may be watt-hrs of electrical energy produced by a std. connected generator and automatically stored into a connected electrochemical battery; alternatively the work may be mechanical work to operate an associated, vehicle-mounted machine such as a conveyor. User-friendly interface devices allow the operator to: move a control knob or lever to a marked point to accomplish all FR inputs; alternative VariSafe arrays provide rational arrangements of such input controls and status displays optimized for the specific application.

Feedback Control Functions of FCGs for Forward or Reverse Direction of Travel

Case A—An embodiment with direct drive from the engine to shaft A as shown in FIG. 1$b$.

In this figure, GFb is driven directly by shaft A, forward motion is accomplished by closing or partially closing FR2, causing feedback torque on FCG2 which results in the slowing or stopping of shaft F. This action forces shaft D into control mode of VariGyro, and slowing or stopping ring gear 15. Shaft C then becomes the working shaft, driving PC and output shaft E in the same direction as the input shaft A. Thus, CW rotation (looking into the front of the SIVRT) provided to shaft A gives CW on output shaft E viewed from the same direction; this results in forward-direction travel.

For reverse, slowing or stopping shaft G via FR1 and FCG1 causes shaft C to become the control shaft for the VariGyro and slowing or stopping gear 13. Shaft D then becomes the working shaft, rotating ring gear 15 and driving PC and shaft E in the opposite direction; this results in reverse-direction travel and FCG2 is "inactive".

Case B—An embodiment with direct drive from the engine into shaft AA as shown in FIG. 1$a$.

Due to the addition of gears 1 and 2 in FIG. 1$a$, which cause a reduction of angular velocity of the engine input, the rotation-direction of the VariGyro is changed. For forward travel, closing FR1 (slowing or stopping FCG1 and shaft G) changes shaft C into the control shaft, and shaft D the work shaft, turning output shaft E the same direction as input shaft A, forward. FCG2 is "inactive".

For reverse travel, closing FR2, which slows or stops FCG2 and shaft F, converts shaft D into the control shaft and shaft C into the work shaft. This action drives output shaft E in opposite direction. i.e., reverse. FCG1 is "inactive".

Feedback Control Functions of FCGs for Speed of Travel

Case A—An embodiment with direct drive from the engine to shaft A as shown in FIG. 1b. For this embodiment, GFb rotates at same speed as input shaft A. With shaft A rotating at 2200 rpm and FR2 completely closed, shaft C will be rotating at 4400 rpm. If gears 10 and 12 are the same size as gears 16 and 17, thus not changing speed ratios to the FCG's, shaft G and FCG1 will be rotating at 4400 rpm also. Output shaft E will be rotating at 1100 rpm in the same direction as input shaft A. Shafts D, F and FCG2 will be stationary.

Case B As shown in FIG. 1a, gear size ratios between gear 1 and gear 2 determine the speed of shaft AA (from the engine) to GFa. If the speed of GFa and gear 2 is 2200 rpm and FR1 is completely closed, shaft D, shaft F and FCG2 will be rotating at 4400 rpm, provided gears 10 and 12 are same sized as gears 16 and 17. Output shaft E will be rotating at 1100 rpm in same direction as input shaft AA. Shafts C, G and FCG1 will be stationary.

Function and Operation of Bypass Plugs in FCGs

The purpose of the rotating bypass plugs in the FCGs is to improve engine fuel efficiency by removing the resistance force of circulating fluid through the entire fluid circuit when the FCGs are "inactive", i.e., being driven by their respective shaft F or G, and related FR valve is fully open. In the bypass-open state, fluid is allowed to shunt from the high-pressure (outlet) side of the FCG gearset directly back to the low-pressure (inlet) side of the without building pressure in the rest of the circuit or flowing through the entire system. The fluid-friction losses of flow through this short passage in the housing cover (34) immediately adjacent the gears are minimal.

The rotation orientation of the bypass plugs between open and closed states is controlled by digital servo motor managed by the variformer microprocessor. When VariMode is in the "Park" position or, optionally also in "Neutral", both FCGs are inactive and both bypasses are opened.

When a travel direction is selected by the VariMode, the servo on the bypass for the FCG that becomes the "control" is closed, and the FCG and its corresponding FR valve then controls the rotational speed of its corresponding shaft, either F or G. The bypass on the other "inactive" FCG is kept open.

Fluid reservoir details (hydraulic systems). The shared fluid reservoir connected between the two torque-feedback systems is a known low-pressure tank (unheated, rated for about 100 to 1 500 kPa) of sufficient volume to contain at least 3× the volume of liquid needed to fill the all the interconnecting lines and system devices. The reservoir is provided with an array of known dynamic-monitoring devices to sense instant contents-level and temperature thereof. In case either parameter is outside predetermined limits for the specific application and working fluid, the integrated monitoring system is adapted to activate immediate corrective responses (visual alarm signals to operator, commence sufficient fluid-cooling actions and, if indicated, initiate variformer shut-down procedures).

Hydraulic Working Fluid/Variformer Lubricant

The fluid used in FCG_FR hydraulic circuits of the present invention may be: a known hydraulic fluid such as a mineral oil base, synthetic base, phosphate ester base or an advanced fluid which exhibits physical properties appropriate for the proposed application. In light-duty embodiments the fluid may be standard automatic transmission fluid and shared with geartrain elements of the variformer. For heavy-duty embodiments, the FCG_FR fluid is separated from the variformer lubricant and its properties including: high boiling point, minimal corrosion tendencies toward FR-system materials, high chemical decomposition stability, high oxidation resistance and appropriate lubricant characteristics, are critical.

Optional Heat-Exchange Means (Heating or Cooling):

For conditions when either of the two torque-feedback units is operating at high output pressure and low flow volume, the circulating fluid will be subject to Joule heating and require an effective heat exchanger, (OHE), in the circuit; this exchanger is provided with provisions for free and forced convection to surrounding air. Optionally, for applications which experience cold starts at temperatures below ~10 deg C., the (OHE) may be further adapted to provide means for heating for the working fluid up to about 20 deg C. before torque is transferred through the variformer. A known heat exchanger with specified characteristics (area, thermal duty, air-circulation, internal volume, pressure, etc.) may be provided. This subassembly will provide cooling under typical operating conditions and also allow for pre-heating of 10-50 L of working fluid to optimum operational temperature range (~2-10 deg C.), i.e., within about 30 min, in the case of a vehicle parked at temperatures below freezing. Known devices for fluid over-temp/overpressure safety are provided for both FCG_FR loops.

External Hydraulic Loads

As shown in FIG. 1d, the torque-feedback circuits may optionally provide high-pressure operational fluid to ancillary hydraulics of the machine or vehicle. Appropriate known flow-controls, directional control valves (DCV), are shown in FIG. 1d are used to manage the interconnection; a reserve emergency fluid vessel and manual isolation valves are not shown for such attachments and may also be needed depending upon conditions, i.e., power being delivered for vehicle propulsion and simultaneous power demand of ancillary circuits.

VariSafe Operator Interface Elements, Functions and Indicia. The VariSafe (22) group of subassemblies includes: VariLogic (24), VariRPM (51), VariRange (52), VariPedal (53), VariPanel (54) and the VariMode (55). These elements are shown in FIGS. 4a-4c and the specific indicia are indicated in Table 1. Each of these special terms is defined and explained below.

As used herein, the term VariRPM (51) means a control system to set the minimum speed and power level of the transmission input. The system may be mechanically or digitally connected to the power source, typically an engine, whereby the range of speeds to be used is set. The operator input device may be a combination of known devices/mechanisms which receives one or more specific linear or rotary movements as operator commands and delivers/translates them to define a particular range of minimum-allowable and a maximum-allowable engine speed.

Alternatively the speed-input device may be a combination of known electronic components which are adapted to communicate signals to the variformer microprocessor reflective of its angular or linear displacements during setting by the operator. For example, this control is adapted to command the engine to run within a predetermined RPM range, e.g., a specific minimum of 1000 and precise upper limit of 1800.

For a truck adapted for network control of engine and driveline functions, this subassembly includes a known, stalk-mounted, manual lever which provides engine-speed-selection inputs to algorithms stored in the variformer microprocessor or in the engine-control-module (ECM). This lever-control element provides digital-electric signals to set desired input speed and power (of the electrical-motor or engine) with an optional array of predetermined set points (audible clicks, visible colored LED status display, tactile-marked positions, etc.). In a typical embodiment this lever is attached on the right side of the steering column and moves over an arc of about 120 deg. The lever housing is provided with integrated, visible status indicator means to display the current setting as well as human-perceptible means to confirm resetting to different angle and a new status. Because some FMVSS-203 compliant steering wheels have a large hub to enclose air bag(s), the visible status display for such situations may not be fully visible to the operator; in such cases, the status indicator aspects is adapted for rational placement on the VariPanel for full visibility to the driver at all times and at any ambient light level.

With such fully-customized command possibilities and input devices as provided by the variformer, the vehicle max speed by pedal command would be limited by engine assuming that: (a) the load was approximately constant, (b) the engine was operating in an allowable-preferable mode, i.e., torque, fuel-consumption, GHG emissions, imminent-stalling, etc. and (c) a fixed drive-axle ratio.

Custom versions of the VariRPM are adapted for left-handed operators or RHO countries by fixing it on the left of the column. This control may also be provided with a set of visible status markers/lights to show the input setting as a fraction (0 to 1) of the preferred range of the power source (IC engine or electric motor).

As used herein, the term VariRange (52) means a system of controls and displays which sets the instant desired gear-ratio limits which are available to VariPedal (53). This allows operator to set the vehicle speed range accessible by full-travel of the VariPedal. This feature allows travel speed to be coordinated with the instant-local roadway situation and other factors including distance to upcoming stops. FMVSS-102 does not anticipate such controls.

As shown in the illustrative embodiment of FIG. 4b, there are four buttons to select a percentage of the total inherent geartrain ratio-range which is currently allocated to the VariPedal (53); a single lighted button displays the current setting. Once the engine speed is set, the range control then allocates a portion of the geartrain-range allowed to the pedal. For example, with engine speed set to about 1500 RPM, the operator can select the allowable variformer geartrain ratio range to a particular upper limit (in the range 0.1 m/sec<creeping vehicle forward speed <1 m/sec) and a specific lower limit (in the range 1 m/sec<max vehicle forward speed <15 m/sec).

It is anticipated that this control will be very helpful to drivers during their transition stages from typical standard transmissions. This feature allows travel speed to be coordinated with the instant-local roadway situation or with upcoming stops. Such a setting FMVSS-102 does not anticipate such controls. In another illustrative embodiment, the buttons are programmed to command the variformer to allow a predetermined, customized progression of 2-4 min-max angular velocity domains of shaft E.

The term VariLogic (24) means the relationship and interdependence of an ordered sequence of SIVRT responses to operator inputs and commands for intended vehicle movements, and other optional on-board activities, into the networked variformer microprocessor which controls safe operation of a working machine provided with the SIVRT transmission. This logic is implemented as an ordered combination of commands and algorithms which assure that instant operator commands for safe, efficient engine and transmission-creeping functions override-replace OEM-normal-default inputs from vehicle-control systems provided-required for highway operation. Classic working machines were operated by skilled technicians with extensive experience using only: gearshift lever, foot clutch, and fuel-feed pedal. Today, all operators drive-by-wire and OEM-required regulatory software-hardware filters all commands to conform them to latest legal limits; often expensive and deadly UNK-UNKS in the code, such as persistent engine stalling due to low idle, are discovered. As learned in the recent dieselgate case, typical ECM code: may contain defeat mechanisms in engine controls/transmission shifting patterns, is secret, is highly vulnerable to network hacking, highly proprietary, is not revealed to or understandable by government regulatory agencies and not likely to be known by any owner, even in part. VariLogic algorithms have been developed to prevent refuse-truck accidents resulting from such malicious code.

VariLogic (24) is a rational, orderly setup process between the operator, engine, machine and the job at hand which may obviate some undocumented software glitches as typically plague new, well-intentioned robotic controls. VariLogic (24) includes the sequential process of setting: 1—engine speed, min, max; 2—travel direction; 3—veriformer ratio-range, min, max; and 4—variety/range of allowed operator-dynamic commands (pedal or other). Dynamic or real-time operator commands include signals from a foot pedal or hand lever. Command range includes the extent of the arc of movement of a pedal lever and rate of movement; optionally, the device may also be assigned a resistance-force profile, i.e., increasing linear or exponential across its range.

The series of manual inputs for vehicle articulation is accomplished by buttons, knobs, levers, pedals and other known means in the cab, as shown in FIGS. 4a-c. The variformer digital interface combines and translates these inputs into arguments for digital commands of the stored operational algorithms. Many modern working machines with rigid emissions-control systems may also require the SIVRT microprocessor to interact with the ECM (engine control module) and to operate the engine ONLY within mandatory efficiency and emissions parameters.

The VariLogic setup sequence of the present invention includes the following unique order of operator inputs: (a) set the governance values for min-max engine speed; (b) input the desired geartrain ratio limit values by pressing the appropriate button in the array (52), or other input means; (c) set the desired vehicle travel direction from available options PNRF and; (d) set management option for external hydraulics from the choices: None, ExHy1, ExHy2 and ExHy3.

As used herein, the term VariPedal (53) means an ordered combination of known mechanical and/or electronic devices adapted to convey dynamic operator-input commands for the desired vehicle travel velocity to the variformer. One embodiment shown in FIG. 4a is a foot-actuated pedal capable of about 30 deg of angular motion. This element includes combinations of devices which sense the instant angular position of the pedal and provide related digital signals to operate valves FR1 and FR2. The pedal can also be configured to measure the impulse characteristics of the particular input action, i.e., force and angular rate of the operator's foot. Similarly, the pedal can also be configured to provide a particular, selectable force-feedback profile to the operator's foot.

The VariPedal (53) can also be provided with differing and/or graded sensitivity along its angular travel, i.e., the percentage of gear-ratio change per degree of angular deflection can be predetermined according to the operator's preferences. For example, a certain vehicle speed range could be coordinated with strong force feedback and low speed-sensitivity per degree of travel. Some heavily-loaded refuse trucks may have a low rollover threshold (~0.2 g) due to the instant vertical center of gravity (CG) being greater than 2.5 m. VeriPedal characteristics can be automatically controlled by coordinating dynamic input data on: sensed load, velocity, turning radius and roadway angle under the vehicle; this is done in novel ways far beyond the elementary roll stability control requirements of latest FMVSS-136 (rev 2015). While it is anticipated that the pedal will be operated by the operator's right foot in RHD applications, placement of the pedal (53) is variable.

The VariPedal (53) rotates downward from its default "up" position about its pivot axis which is typically configured at the "h" end. Alternatively, for an "overhead suspended pedal" the pedal pivot axis may be fixed under the dash, i.e., not at a point along the pedal length.

As used herein, the term VariPanel (54) means an accessory panel which may be positioned uniquely and securely by the operator adjacent the steering wheel for ease of fingertip use and to support/display the several advanced VariSafe controls. The panel (54) may be provided in a range of sizes/shapes (rectangle, circle, oval, other) to meet particular preferences and needs. The instrumentation modules supported on the panel are positionable across a modular array and it is expected that most operators will be able to setup a particular array which suits their special needs. It is also expected that certain additional status-hazard-warnings not anticipated by FMVSS-114 and -135 may be added, e.g., OSHA warnings; the modular configuration will allow such additions.

VariPanel may also include optional controls for ranging sensors and machine/computer vision to detect surrounding environment and activate certain additional warnings and displays, e.g., operator preference selected (accurate Differential Global Positioning System coordinates, route codes, client-stop-point service data, etc.). The VariPanel (54) is also the new placement location for the present advanced safety controls status displays and warning prompts not found in classic cabs. An alternative RHD VariPanel is a raised floor console.

As used herein, the term VariMode (55) means an operator command input device by which the transmission mode (=direction-of-travel state for the vehicle) is selected. As disclosed in the embodiment shown in FIG. 4b, one such device is a mechanical, "Y-pattern" lever which is moveable between P, N, R and F state positions. Park, Neutral, Reverse and Forward modes are indicated for the VariMode selector (55).

The VariMode selector may also be configured to activate hazard sensors and warnings for overhead, crew-lateral position, forward or reverse truck movements (~5 m range, radar-sonar-other). The VariMode selector mounted on operator-positionable VariPanel on right side of steering column provides optimized ergonomics (easy driver reach distance, separated distinct positive selector positions [human perceptions: audible, touch, feel, sight], no other close-by controls which can be accidentally committed, triggered, disconnected, etc.).

In US, compact, reverted, internal-planetary gearboxes are usually customized for the specific-year EPA driving schedule and one or more particular IC engines to meet various legal requirements for selected autos and light trucks. This procedure is accomplished by computer modeling of ratios and related driving-shifting patterns as well as testing of representative actual products on special street-type courses under selected environmental conditions. The resulting allowable propulsion systems usually include an engine paired with a torque converter plus transmission combo (with up to 11 external, band-type clutches). No evidence has been found which confirms utility, efficiency, robustness and reliability of the resulting gearbox technologies as applied to heavy-duty working machines.

For a typical work-machine, the alternative SIVRT variformer gearing configuration is scaled from the prototype disclosed for the particular combination of output demands and input power limitations using DIN, ISO and AGMA guidelines. Although non-road diesel engines smaller than 37 kw must comply with updated Tier 1-3 emissions rules, no functional EPA schedules of speed-load-distance-time operations have been announced for off-road work-machines including amphibious and maritime embodiments. In contrast to modern driver controls (either speed plus direction or key-in destination GPS), a SIVRT machine operator usually has two torque-feedback control levers for speed and direction.

> Example 2. Alternative Variformer for Construction I Military I Law Enforcement Applications. These embodiments include Robotic and Autonomous System (RAS) vehicles which have one or more robotic weapons and/or supplemental autonomous elements, i.e., can becomes an active partner commanded by human operators in dangerous situations, and is also independently able to determine immediate appropriate optimal robotic command sequences responsive to selected sensed risks by means of stored algorithms and dynamic status updates. RAS vehicles include: a basic platform, firmware, software, a connected duplex network for human inputs along with automatic or responsive displays and status updates, a power source and SIVRT variformer(s) which actuate(s) a particular propulsion direction velocity period (time or travel distance) along with selected other hydraulic actions to control a vehicle or harborcraft. Marine or harborcraft variformer configurations such as a ferry or tug boat also include many of the RAS-type features for improved precision of navigation and safety reasons. Construction embodiments include direct mechanical or digitally-linked operator inputs to variformer for propulsion and to hydraulic controls for a bucket configured for scooping/dumping movements and other functions.

For RAS and construction embodiments, the input power range is typically about 5-30 kw at about 1200-3000 rpm from an electric motor or IC engine. Forward or reverse travel at about 0-10 km/hr is controlled by manual inputs or program code; these commands activate torque feedback into the variformer via wireless or electro-mechanical operator-input devices coupled to (FR1) and (FR2). For engine-powered embodiments intended for missions requiring full-power for longer than about 100 minutes, an external DC-generator or alternator may be added; thereby FCGs of the SIVRT may also be used to generate electric current for ancillary attachments such as lights or battery charging.

Figure 5A:
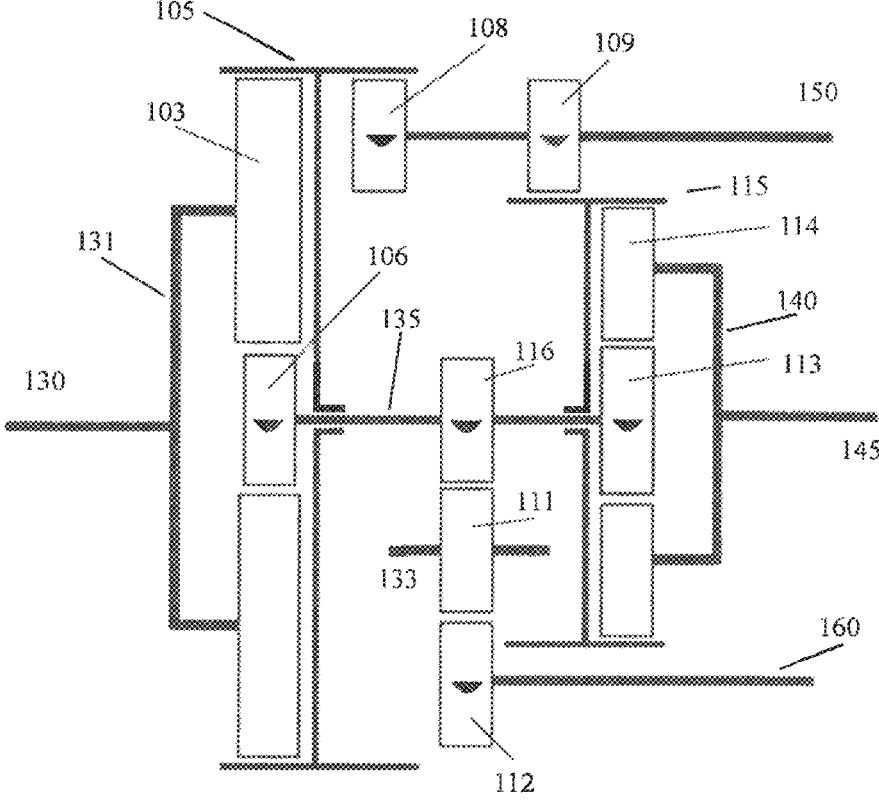
FIG. 5a is a Schematic Diagram of Alternative Variformer Configuration. This figure illustrates an example variformer embodiment which combines selected basic variformer elements into a lightweight prototype gearbox unit for working-machine applications which require about 5-30 kw of power delivered to a typical vehicle driveline provided with known 2WD or 4WD differentials and intended for precise operation by an on-board or bystander human operator at creeping speeds (about 100 mm/sec, either direction) or hauling-breaching velocities up to about 8 m/sec. The numerical indicia of these elements (corresponding to 3 to 15 in FIGS. 1*a-d*) have been changed by adding 100 in this example, i.e., 3b becomes 103. This allows for alternative materials (including polymers) and related design optimization parameters according to DIN and AGMA design standards for gears, bearings and shafts as noted in TABLES 1 and 2. As in FIG. 1d, operator commands are input via lever movements either directly into the FRs or into the local network.

An alternative variformer configuration for RAS or construction embodiments is shown in FIG. 5a; it consists of two planetary gearsets, one larger than the other. The planet carrier-arms on both gearsets connect to input and output shafts respectively that extend outside the gearbox. This alternative configuration consists of an input planetary gearset mated to an output planetary gearset. Although this input drive embodiment is a simpler configuration without the gearframe (GFa) or (GFb) as shown in FIGS. 1a and 1b, it operates the same way. The ring gear (105) takes the place of gears (5a) or (5b), and the sun gear (106) takes the place of (6a) or (6b). The planetary carrier (131) replaces Gear Frame a (GFa) or (GFb), and carries the planet gears (103a-103c). These gears function the same as (3a) and (4a), or (3b) and (4b), in that they are free to spin, thus allowing gears (105) and (106) to rotate at different rates. As one gear slows down, the other rotates faster.

On the larger input gearset, the ring gear (105) is a double-faced, internal-only ring gear which rotates on shaft (135); one side-face contains the planet gears (103a) to (103c) supported on arm (131) and a sun gear (106). The teeth of its other side-face mesh with a stationary gear (108) fixed to shaft (150). Double-sided ring gear (115) on the smaller output gearset is supported on shaft (135) and has both internal and external gear teeth. Its internal teeth mesh with the planetary gears (114a) and (114b); carrier-arm (140) is fixed to output shaft (145). Related sun gear (113), which meshes with both these planet gears, is also fixed on shaft (135). The external teeth of (115) mesh with gear (109) which is also fixed on shaft (150) and linked to FCG1; the latter provides torque feedback into both ring gears.

In this alternative configuration, the ring gears rotate in opposite directions. The sun gears on both planetary gearsets are connected together by shaft (135) which is linked to fluid-coupled gearset (FCG2) by gears (111) and (112). Generally, for the example variformer configurations shown, the gearbox can be driven from either end, depending upon the particular application. The specific fluid-flow resistances of (FR1) and (FR2) control both the rotational velocity ratio between variformer input and output as well as particular rotation direction of the output.

In "neutral" setting of the torque feedback controls, the input ring gear and sun gear both spin in the same direction. The sun gear from the input planetary gearset drives the sun gear in the output gearset, spinning its planetary gears which remain stationary with the output planetary carrier-arm and output shaft, thus spinning the output ring gear in the opposite direction as the input ring gear. The gears connecting the ring gears spin at the same rate and direction as the sun gears. The planetary gears on the input planetary carrier, being free to spin as necessary, balance out the different rotational speeds of the two different sized ring gears. In "neutral", no torque feedback is supplied by either FCG.

In "forward" setting of the feedback controls, torque feedback is applied from (FCG1) and both ring gears are slowed or stopped. The slowing of the input ring gear forces its planetary gears to spin the input sun gear faster, and as the output sun gear spins faster and its ring gear slower, the planetary gears begin to rotate around in the forward direction, rotating the planet carrier and output shaft in the forward direction also.

In "reverse" setting of the torque feedback controls, feedback is applied from (FCG2) and both sun gears are slowed or stopped. The slowing of the input sun gear forces its planetary gears to spin the input ring gear faster and this causes the output ring gear to spin faster in its opposite direction. As the output sun gear slows and the output ring gears increases its speed, the planetary gears start to rotate and rotate the output carrier and output shaft in the reverse direction.

Figure 5B:
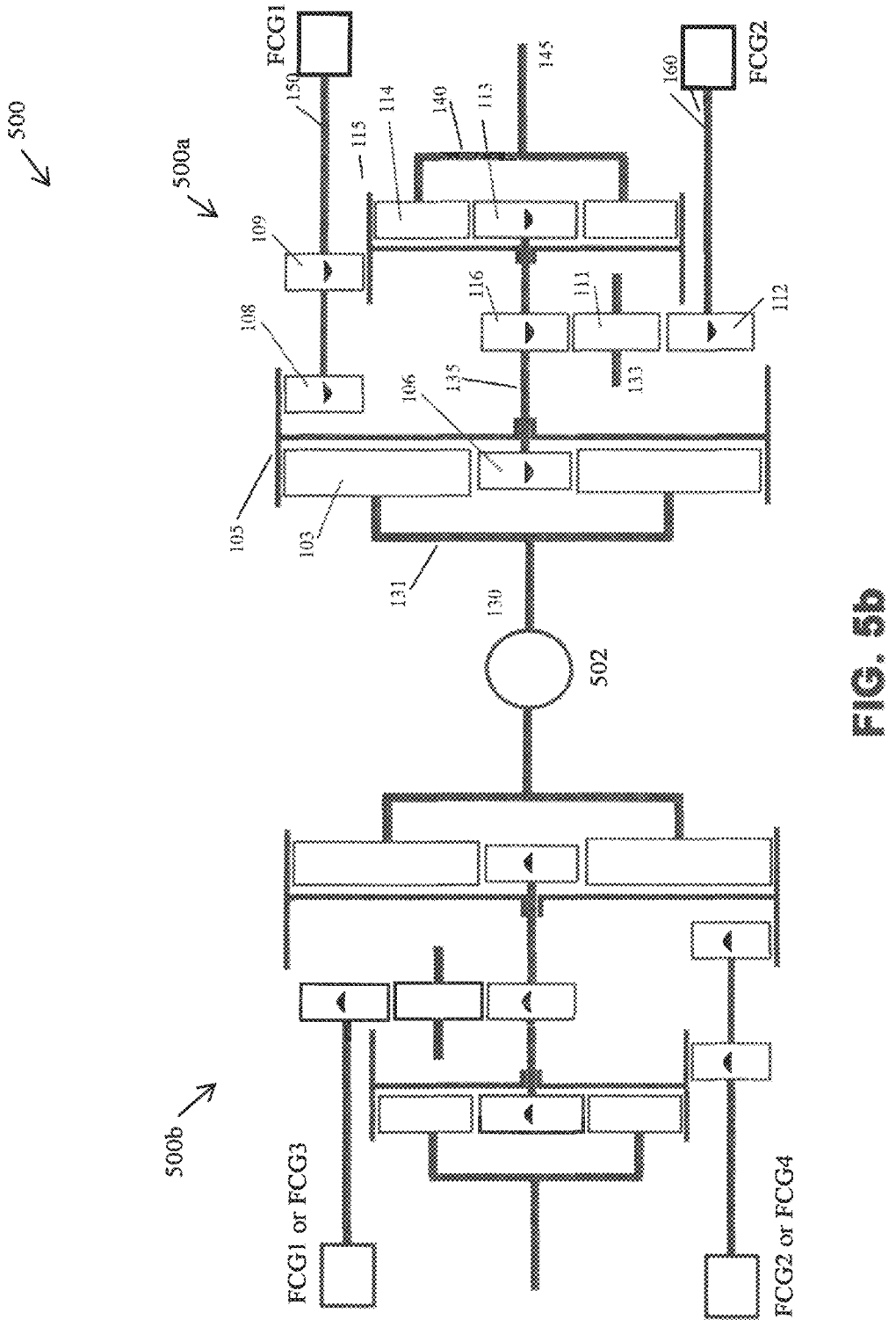
FIG. 5b Schematic Diagram of Double-Variformer for Tracked or Skidsteer 4-Wheeled Machines, including RAS, construction and amphibious. This diagram illustrates the combination of two prototype variformer gearboxes for tracked or wheel-paired propulsion [precise creeping speeds (about 100 mm/sec, either direction) or hauling-breaching velocities up to about 8 m/sec] of a working machine or remote-controlled robot RAS operative. Indicia for alternative variformer elements are the same as in FIG. 5a. In this illustrative alternative configuration, the two variformers are shown with their inputs face-to-face and the known, particular gearsets linking each, or both together, to a single prime-mover (IC engine or electric motor located alongside or above) are not shown; in this diagram the input power connection is indicated by the circle. Optionally, using appropriate known mechanical means, the variformers could be located at opposite ends of the machine chassis with alternative mountings of single or multiple prime-mover(s) between, beside or above these position(s). For such applications, both variformers would be downscaled in size and power transmission capabilities (gear materials, diameter, module, face width, etc.) using DIN and AGMA design standards for gears, bearings and shafts from the prototype design values noted in TABLES 1 and 2.

For breaching across or through an obstacle or travel through rough terrain/across shallow marshes (less than about 500 mm water), single-variformer machines may be provided with independent final-drives for side-paired wheels (similar to a skidloader, wheels on the same side are driven at the same RPM) or right and left tracks. FIG. 5b shows an illustration of dual variformers configured for such positive-propulsion applications.

One embodiment of the present invention provides a geartrain (500) that includes an input shaft (130), an output shaft (145), a first intermediate shaft (135), a second intermediate shaft (133), a first auxiliary shaft (150), and a second auxiliary shaft (160). A first planetary carrier (131) is supported on the input shaft (130), wherein the first planetary carrier (131) has two or more first planetary gears (103a, 103b) that engage a first sun gear (106) supported on the first intermediate shaft (135). A first ring gear (105) engages the two or more first planetary gears (103a, 103b) and a first stationary gear (108) supported on the first auxiliary shaft (150). A first gear (116) is supported on the first intermediate shaft. A second gear (111) is supported on the second intermediate shaft (133) that engages the first gear (116). A third gear (112) is supported on the second auxiliary shaft (160) that engages the second gear (111). A second planetary carrier (140) is supported on the output shaft (145), wherein the second planetary carrier (140) has two or more second planetary gears (114a, 114b) that engage a second sun gear (113) supported on the first intermediate shaft (135). A second ring gear (115) engages the two or more second planetary gears (114a, 114b) and a second stationary gear (109) supported on the first auxiliary shaft (150).

In one aspect, the first ring gear (105) is larger than the second ring gear (115). In another aspect, a first fluid-coupled-gearset (FCG1) is coupled to the first auxiliary shaft (150), a second fluid-coupled-gearset (FCG2) is coupled to the second auxiliary shaft (160), and the first and second fluid-coupled-gearsets (FCG1, FCG2) control an output gear ratio of the output shaft (145) to the input shaft (130) and a rotational direction of the output shaft (145). In another aspect, the geartrain operates in a neutral setting when no torque feedback is supplied by the first and second fluid-coupled-gearsets (FCG1, FCG2), a forward setting when a torque feedback is supplied by the first fluid-coupled-gearset (FCG1), and a reverse setting when the torque feedback is supplied by the second fluid-coupled-gearset (FCG2). In another aspect, an operator interface is coupled to the geartrain that stops, starts or reverses the geartrain. In another aspect, the geartrain does not include a band-clutch or a disc-clutch. In another aspect, a power source is coupled to the input shaft (130).

Another embodiment of the present invention provides a method of operating a geartrain by providing the geartrain described above, the geartrain further comprising a first fluid-coupled-gearset (FCG1) coupled to the first auxiliary shaft (150) and a second fluid-coupled-gearset (FCG2) coupled to the second auxiliary shaft (160). The output shaft (145) is turned in a same direction of the input shaft (130) by activating the first fluid-coupled-gearset (FCG1) and inactivating the second fluid-coupled-gearset (FCG2). The output shaft (145) is turned in an opposite direction of the input shaft (130) by inactivating the first fluid-coupledgearset (FCG1) and activating the second fluid-coupled-gearset (FCG2). The output shaft (145) is neutralized by inactivating the first fluid-coupled-gearset (FCG1) and inactivating the second fluid-coupled-gearset (FCG2).

In one aspect, the first ring gear (105) is larger than the second ring gear (115). In another aspect, an operator interface coupled to the geartrain that stops, starts or reverses the geartrain. In another aspect, the geartrain does not include a band-clutch or a disc-clutch. In another aspect, a power source is coupled to the input shaft (130).

Example 3. Variformer for Compact Working Machines (VCWM, adapted for digging, material scooping and high-lift dumping) or RAS. See FIG. 5b. For VCWM embodiments the input power range is typically about 5-30 kw at about 1200-3000 rpm from an on-board Otto- or Diesel-cycle engine. For these embodiments hydraulic power from the FCGs of the dual variformer configuration may be used to activate non-propulsion, external functions including: (a) hydraulic operations of main, materials-transport bucket, (b) hydraulic operation of a small, articulated material scooper adapted for filling the main bucket, (c) dynamic, roll-over-safety interlocks for high-lifting the main bucket to dump its contents into a tall vehicle (heavy dump truck) or tall roll-off container (dumpster), or (d) to drive a generator/alternator of electric current for non-transport ancillary attachments such as lights or battery charging. Such VCWM embodiments intended for construction or landscaping may be all-wheel drive using a single variformer with known differentials or tracked/skidsteer propulsion using dual variformers. Such embodiments are operable at speeds up to about 4 km/hr in either direction, configured to handle main-bucket loads of about 600 kg and to lift to heights in the range 1.3 to 1.8 m.

The basic VCWM is typically configured for a walk-behind operator; however, it may be provided with an optional fold-down platform to support a standing or seated operator. Travel is controlled by 2 levers like most tracked machines. Each lever controls the flow resistance of both fluid-metering valves which define the direction, extent and time duration of torque feedback being applied to its attached variformer; a "local" operator may actuate main-bucket controls manually. Similarly, robotic-assisted VCWM management for travel and all other functions may be accomplished via remote human inputs into a digital-control network connected to the machine.

Center-lever position for both variformers is "neutral', i.e., no propulsion. Push forward on a lever and its connected variformer starts in forward, pull back and that side drives backward; the speed varies with lever-displacement distance. Both levers forward same amount simultaneously, the VCWM goes straight forward. Push one lever forward less than the other, it will move forward and turn in the selected direction. Push only one lever, it will spin on the opposite track. One lever forward and the other one reverse, it will spin around in one place.

When autonomous travel control is activated for the VCWM, network-connected, preconfigured management algorithms are provided to determine the optimal, situation-responsive travel direction vector and velocity and will continuously execute feedback torques into variformer(s) as needed for a predetermined time interval with dynamic corrections updating.

In another embodiment of the present invention, a geartrain system (550) includes a first geartrain (500a), a second geartrain (500b) and a power source (502). The first geartrain (500a) and the second geartrain (500b) each include: an input shaft (130), an output shaft (145), a first intermediate shaft (135), a second intermediate shaft (133), a first auxiliary shaft (150), and a second auxiliary shaft (160). A first planetary carrier (131) is supported on the input shaft (130), wherein the first planetary carrier (131) has two or more first planetary gears (103a, 103b) that engage a first sun gear (106) supported on the first intermediate shaft (135). A first ring gear (105) engages the two or more first planetary gears (103a, 103b) and a first stationary gear (108) supported on the first auxiliary shaft (150). A first gear (116) is supported on the first intermediate shaft. A second gear (111) is supported on the second intermediate shaft (133) that engages the first gear (116). A third gear (112) is supported on the second auxiliary shaft (160) that engages the second gear (111). A second planetary carrier (140) is supported on the output shaft (145), wherein the second planetary carrier (140) has two or more second planetary gears (114a, 114b) that engage a second sun gear (113) supported on the first intermediate shaft (135). A second ring gear (115) engages the two or more second planetary gears (114a, 114b) and a second stationary gear (109) supported on the first auxiliary shaft (150). The power source (502) is coupled to the input shaft (130) of the first geartrain (500a) and the input shaft (130) of the second geartrain (500b).

In one aspect, the first ring gear (105) is larger than the second ring gear (115). In another aspect, a first fluid-coupled-gearset (FCG1) is coupled to the first auxiliary shaft (150) of the first geartrain (500a) and the second geartrain (500b), a second fluid-coupled-gearset (FCG2) is coupled to the second auxiliary shaft (160) of the first geartrain (500a) and the second geartrain (500b), and the first and second fluid-coupled-gearsets (FCG1, FCG2) control an output gear ratio of the output shaft (145) to the input shaft (130)) of the first geartrain (500a) and the second geartrain (500b) and a rotational direction of the output shaft (145) of the first geartrain (500a) and the second geartrain (500b). In another aspect, the geartrain system operates in: a neutral setting when no torque feedback is supplied by the first and second fluid-coupled-gearsets (FCG1, FCG2), a forward setting when a torque feedback is supplied by the first fluid-coupled-gearset (FCG1), and a reverse setting when the torque feedback is supplied by the second fluid-coupled-gearset (FCG2). In another aspect, a first fluid-coupled-gearset (FCG1) is coupled to the first auxiliary shaft (150) of the first geartrain (500a), a second fluid-coupled-gearset (FCG2) is coupled to the second auxiliary shaft (160) of the first geartrain (500a), a third fluid-coupled-gearset (FCG3) is coupled to the first auxiliary shaft (150) of the second geartrain (500b), a fourth fluid-coupled-gearset (FCG4) is coupled to the second auxiliary shaft (160) of the second geartrain (500b), the first and second fluid-coupled-gearsets (FCG1, FCG2) control an output gear ratio of the output shaft (145) to the input shaft (130) of the first geartrain (500a) and a rotational direction of the output shaft (145) of the first geartrain (500a), and the third and fourth fluid-coupled-gearsets (FCG3, FCG4) control an output gear ratio of the output shaft (145) to the input shaft (130) of the second geartrain (500b) and a rotational direction of the output shaft (145) of the second geartrain (500b). In another aspect, the first geartrain (500a) operates in a neutral setting when no torque feedback is supplied by the first and second fluid-coupled-gearsets (FCG1, FCG2), a forward setting when a torque feedback is supplied by the first fluid-coupled-gearset (FCG1), and a reverse setting when the torque feedback is supplied by the second fluid-coupled-gearset (FCG2), and the second geartrain (500b) operates in the neutral setting when no torque feedback is supplied by the third and fourth fluid-coupled-gearsets (FCG3, FCG4), the forward setting when the torque feedback is supplied by the third fluid-coupled-gearset (FCG3), and the reverse setting when the torque feedback is supplied by the fourth fluid-coupled-gearset (FCG4). In another aspect, an operator interface is coupled to the geartrain that stops, starts or reverses the geartrain system. In another aspect, the geartrain system does not include a band-clutch or a disc-clutch.

Another embodiment of the present invention provides a method of operating a geartrain system by providing the geartrain system described above, the first geartrain and the second geartrain further comprising a first fluid-coupled-gearset (FCG1) coupled to the first auxiliary shaft (150) and a second fluid-coupled-gearset (FCG2) coupled to the second auxiliary shaft (160). The output shafts (145) of the first geartrain (500a) and the second geartrain (500b) turn in a same direction of the input shaft (130) by activating the first fluid-coupled-gearset (FCG1) and inactivating the second fluid-coupled-gearset (FCG2). The output shafts (145) of the first geartrain (500a) and the second geartrain (500b) turn in an opposite direction of the input shaft (130) by inactivating the first fluid-coupled-gearset (FCG1) and activating the second fluid-coupled-gearset (FCG2). The output shafts (145) of the first geartrain (500a) and the second geartrain (500b) are neutralized by inactivating the first fluid-coupled-gearset (FCG1) and inactivating the second fluid-coupled-gearset (FCG2).

In one aspect, the first ring gear (105) is larger than the second ring gear (115). In another aspect, an operator interface is coupled to the first geartrain (500a) and second geartrain (500b) that stops, starts or reverses the geartrain system. In another aspect, the geartrain system does not include a band-clutch or a disc-clutch.

Another embodiment of the present invention provides a method of operating a geartrain system that includes providing the geartrain system described above, further comprising a first fluid-coupled-gearset (FCG1) coupled to the first auxiliary shaft (150) of the first geartrain (500a), a second fluid-coupled-gearset (FCG2) coupled to the second auxiliary shaft (160) of the first geartrain (500a), a third fluid-coupled-gearset (FCG3) coupled to the first auxiliary shaft (150) of the second geartrain (500b), and a fourth fluid-coupled-gearset (FCG4) coupled to the second auxiliary shaft (160) of the second geartrain (500b). The output shaft (145) turns in a same direction of the input shaft (130) of the first geartrain (500a) by activating the first fluid-coupled-gearset (FCG1) and inactivating the second fluid-coupled-gearset (FCG2). The output shaft (145) turns in an opposite direction of the input shaft (130) of the first geartrain (500a) by inactivating the first fluid-coupled-gearset (FCG1) and activating the second fluid-coupled-gearset (FCG2). The output shaft (145) of the first geartrain (500a) is neutralized by inactivating the first fluid-coupled-gearset (FCG1) and inactivating the second fluid-coupled-gearset (FCG2). The output shaft (145) turns in a same direction of the input shaft (130) of the second geartrain (500b) by activating the third fluid-coupled-gearset (FCG3) and inactivating the fourth fluid-coupled-gearset (FCG4). The output shaft (145) turns in an opposite direction of the input shaft (130) of the second geartrain (500b) by inactivating the third fluid-coupled-gearset (FCG3) and activating the fourth fluid-coupled-gearset (FCG4). The output shaft (145) of the second geartrain (500b) is neutralized by inactivating the third fluid-coupled-gearset (FCG3) and inactivating the fourth fluid-coupled-gearset (FCG4).

In one aspect, the first ring gear (105) is larger than the second ring gear (115). In another aspect, an operator interface is coupled to the first geartrain (500a) and second geartrain (500b) that stops, starts or reverses the geartrain system. In another aspect, the geartrain system does not include a band-clutch or a disc-clutch.

Another alternative embodiment for the VariMode selector is provision of lever-integrated haptic-devices or features (touch-perceptible detents, gates, etc.) at preset points along the accessible range of transmission ratios for the current vehicle-travel direction (either forward or reverse, both FCG1 and FCG2). For this embodiment, the preset values would be defined in the purchase specification or in an "original setup for service."

As used herein, the special scaling terms for variformer transmission elements have the following meanings.

Element component size and shape: the physical dimensions of the element, i.e., module, pitch circle, gear-axis spacing, L, W, T, working-face curvature, gear diameter(s), bore, web thickness, etc.

Element material: the metals, alloys, weldments of different alloys, cermets, bonded composites of polymers and elastomers which may be used to prepare the element. The term material also includes all special time+temperature+ stress "conditioning treatments" used to impart extraordinary microstructure and/or mechanical properties to the element, e.g., heat treatment, warm-working and maraging.

Element surface characteristics: the specialized treatments applied to selected working surfaces of an element such as chemical deburring, mechanical polishing, electropolishing, carburizing, nitriding, vapor deposition, plating, etc. used to impart critical mechanical or chemical properties. Examples of such properties include: resistance to fatigue/abrasive wear, low coefficient of dry friction and chemical affinity for bonding with lubricant molecules provided as solid films or fluids.

Examples below illustrate scaling of: tooth-profile features, pitch-circle diameter, tooth-face width, material TYS strength, material fatigue strength, working-face-surface layers &-tribology (including localized alloying, and heat treatments). Such scaling adapts the variforming transmission of the present invention to a particular application, i.e., max geartrain ratio, torque, power, duty cycles, special environments (dust, high temperature, noise-vibration limits, etc.).

Example E1. Illustrative 30 kW Working-Machine Embodiment

This example illustrates how the working-model variformer parameters disclosed in Table 1 and described herein are conservatively scaled into a particular type of challenging, practical application using known design technics for US (AGMA) and/or SI-metric (ISO) unit systems. The basis for this example is a vehicle powered by a typical 30 kW diesel engine, i.e., relatively-flat torque v. RPM operating characteristic and optimum RPM of about 2200. The application for this machine is taken as a daily pickup route of 200-400 material-loading stops, many of which occur within about 200 m of each other and the vehicle must be stopped repeatedly and safely positioned relative to buildings, gates (and other incidental objects including pedestrians and vehicle crew) by forward and reverse creeping movements at each stop. The only vehicle travel which requires sustained highway speeds of about 90 km/hr are the short trips, assumed for this example embodiment as less than 30 km, from a base-point to the beginning or end of the route. This SIVRT example includes a typical on-board hydraulic compactor, i.e., a fluid-coupled external load which is powered by one or both veriformer FCG gearsets and may be either manually engaged or automatically engaged by integrated firmware in the variformer microprocessor. Automated compactor-actuation events and their duration, as triggered by the microprocessor, may be based upon elapsed time since last cycle or alternatively upon data inputs from networked load sensors fixed into the body. Further, the compactor function may be called either during creeping or highway travel.

Pitch Circle, Tooth Profile and Face Width Scaling. For this example, scaling of the various geartrain elements is done using known methods and appropriate technical documents for gearsets and geartrains as currently offered by AGMA. However, any/all application-scaling of the original variformer model elements disclosed herein may alternatively be done using KISSsoft software, which includes relevant ISO standards and certain established European gear-design practices.

The first step of the general scaling procedure is to consider loading, i.e., power rating of the prime mover; this step confirms the typical required steady-state output power and possible inertia loads. Using these factors, the basic design loads for the individual toothed elements can be defined for expected service life and fail-soft modes; this process also includes addition of suitable design-multipliers to protect against failure/damage due to unexpected overloads.

For the straight bevel gears and a 90 deg shaft angle of this exemplary VariGyro, AGMA 2005-D03—Design Manual for Bevel Gears, covers the special scaling process for the bevel gears; calculation steps are comprehensively described in FIGS. 1, 8, 9 and 13 as well as in Annexes A, B and C of this AGMA document.

Pinions 3*a*, 3*b*, 4*a* and 4*b* are scaled as follows: 30<V, equivalent pitch radius, mm<80; 20<pressure angle, deg<25; 2<module, mm<5; 15<face width, mm<30;

Meshing gears 5*a*, 5*b*, 6*a* and 6*b* are scaled as follows: 70<pitch diameter, mm<200; 20<pressure angle, deg<25; 2<module, mm<5; 15<face width, mm<30;

For this example, the simplest spur-gear embodiment for this small working machine is chosen for gears 7-18; this choice eliminates the complex process of analysis of axial-thrust forces in each gearset and the special related bearing requirements which are involved in scaling the variformer model into special-purpose helical gears. However, KISSsoft accomplishes the several steps of both rough and final scaling processes quickly and accurately based upon particular scaling factors which are marked during the computer-modeling process.

For gears 7-18, except 15: 70<pitch diameter, mm<200; 20<pressure angle, deg<25; 2<module, mm<5; 15<face width, mm<30;

For gear 15: 200<pitch diameter, mm<500; 20<pressure angle, deg<25; 2<module, mm<5; 15<face width, mm<30;

For other embodiments which may require helical spur gears: 10<helix angle, deg<30; 2<module, mm<5; 15<face width, mm<30;

For the sun, planetary and ring gear scaling, spur tooth format: 20<pressure angle, deg<25; 2<module, mm<5; 15<face width, mm<30;

TABLE 1

| | | | SIVRT Elements, Functions, Specifications and Indicia | | | |
|---|---|---|---|---|---|---|
| Indicia | FIGS. | Form | Function | d, mm | IN | OUT |
| A | 1b | cyl shaft, w. splined end | GFb input, torque + ang. velocity | | power source | input to GFb |
| AA | 1a | cyl shaft, w. splined end | GFa input, torque + ang. velocity | | power source | gear 1 |
| B | 1b | cyl tube, concentric to A | links 5b to 7b | | gear 5b | gear 7b |
| BB | 1a | cyl shaft | links 5a to 7a | | gear 5a | gear 7a |
| C | 1a-c | cyl shaft | links 6a or 6b to 13 | | gear 6a or 6b | gears 16, 13, PA |
| D | 1a-c | cyl shaft | link 8 to 9, with 17 | | gear 8 | gears 17, 9 |
| E | 1c | cyl shaft | final drive output | | PC carrier | final drive, E |
| F | 1c | cyl shaft | drives FCG2 | | gear 10 | FCG2 |
| G | 1c | cyl shaft | drives FCG1 | | gear 12 | FCG1 |
| H | 1c | Fixed cyl shaft | carries gear 11 | | | |
| J1, J2, J3 | 1c | Fixed cyl shafts | carries idler gears 18a-18c | | | |
| GFa | 1a | GearFrame, fixed to 2 | GFb input, torque + ang. velocity | | gear 2 | fixed to PB |
| GFb | 1b | GearFrame, fixed to A | GFa input, torque + ang. velocity | | shaft A | fixed to PB |
| PC | 1c | planetary carrier | drives shaft E | | gears 14a-14d | shaft E |
| PA | 1a-b | PB-mate, male features | park engagement | N3 | PB engagement | shaft C |
| PB | 1a-b | PA-mate, female features | fixed to GFa or GFb, engages w. PA | | PA engagement | |
| PSL | | pivotable lever (not shown) | fixed to move PA re PB, N4 | | operator | |
| FCG1 | 1d | fluid coupled gearset | mech. torque, control feedback | | shaft G | FR1 |
| FCG2 | 1d | fluid coupled gearset | mech. torque, control feedback | | shaft F | FR2 |
| K1, K2 | 1d | optional mech. coupling | | | shafts F, G | |
| FR1 | 1d | fluid-flow resistance | energy transfer, fm. FCG1 | | operator | |
| FR2 | 1d | fluid-flow resistance | energy transfer, fm. FCG2 | | operator | |

TABLE 1-continued

| Indicia | FIGS. | Form | Function | d, mm | IN | OUT |
|---|---|---|---|---|---|---|
| OHE | 1d | oil heat exchanger | oil heating/cooling | | operator | |
| 1 | 1a | gear#, N2 | torque transfer to trans. | N6 | shaft AA | gear 2 |
| 2 | 1a | gear#, N2 | torque transfer to trans. | N6 | gear 1 | GFa |
| 3a | 1a | bevel gear* | link BB to C | N7 | gear 2 | gears 5a, 6a |
| 3b | 1b | bevel gear* | link B to C | N7 | shaft A | gears 5b, 6b |
| 4a | 1a | bevel gear* | link BB to C | N7 | gear 2 | gears 5a, 6a |
| 4b | 1b | bevel gear* | link B to C | N7 | shaft A | gears 5b, 6b |
| 5a | 1a | bevel gear* | link BB to C | N7 | gears 3a, 4a | shaft BB |
| 5b | 1b | bevel gear* | link B to C | N7 | gears 3b, 4b | shaft B |
| 6a | 1a | bevel gear* | link BB to C | N7 | gears 3a, 4a | shaft C |
| 6b | 1b | bevel gear* | link B to C | N7 | gears 3b, 4b | shaft C |
| 7a | 1a | gear#, N2, N5 | fixed to shaft BB | 123.6 | gear 5a | gear 8 |
| 7b | 1b | gear#, N2, N5 | fixed to shaft B | 123.6 | gear 5b | gear 8 |
| 8 | 1a | gear#, N2, N5 | fixed to shaft D | 123.6 | gear 7a | gears 9, 17 |
| 8 | 1b | gear#, N2, N5 | fixed to shaft D | 123.6 | gear 7b | gears 9, 17 |
| 9 | 1c | planetary gear# | fixed on D, links to 15 | 123.6 | gear 8 | Ring gear 15 |
| 10 | 1c | gear#, N2, N5 | drive FCG2 | N8 | gear 17 | shaft F |
| 11 | 1c | gear#, N2, N5 | link C to G | 123.6 | gear 16 | gear 12 |
| 12 | 1c | gear#, N2, N5 | drive FCG1 | N8 | gear 11 | shaft G |
| 13 | 1c | gear#, N2, N5 | links shaft C to PC | 123.6 | gear 6a or 6b | gears 14a-14d |
| 14a-14d | 1c | planetary gear#, N2, N5 | Links gears 13, 15 to PC, 4X | 123.6 | gears 13, 15 | Planet Carrier |
| 15 | 1c | 54 tooth ring gear# | Links D to E | 370.8 | gear 9 | Planet Carrier |
| 16 | 1c | 18 tooth gear# N2, N5 | fixed on C, links to G | 123.6 | shaft C | gear 11 |
| 17 | 1c | gear#, N2, N5 | fixed on D, links to F | 123.6 | shaft D | gear 10 |
| 18a, 18b, 18c | 1c | gear#, N2, N5 | idlers, 3X, carry ring gear 15 | 123.6 | gear 15 | |
| 20 | 1a-b | VG | SIVRT sub-assy, group | | | |
| 21 | 1c-d | VariSpeed | SIVRT sub-assy, group | | | |
| 22 | 4a-c | VariSafe | SIVRT sub-assy, group | | | |
| 24 | 1d | VL | SIVRT sub-assy, group | | | |
| 30 | 3,3a-b | FCG housing body | | | | |
| 31a, 31b | 3,3a-b | FCG gears# | | N10 | | |
| 31c | 3,3a-b | driven gear rotation | | | | |
| 31d | 3,3a-b | bypass fluid flow | | | | |
| 32 | 3,3a-b | gear drive shaft | | | | |
| 34 | 3,3a-b | FCG housing cover | | | | |
| 34b | 3,3a-b | plug cavity in cover | | | | |
| 35 | 3,3a-b | bypass plug portion | | | | |
| 36 | 3,3a-b | plug rot. arc ~90 deg | | N11 | | |
| 37 | 3,3a-b | bypass outlet channel | | N9 | | |
| 38 | 3,3a-b | bypass inlet channel | | N9 | | |
| 39 | 3,3a-b | plug bypass slot | | N9 | | |
| 51 | 4a | VRPM | device to set desired RPM, pivoted lever | | | |
| 51a | 4c | RPM range limit values | typ, RPM range, low -> high | | | |
| 52 | 4b | VR | device to limit pedal-available RPMs, selection(s) & display device(s) | | | |
| 53 | 4a | VP | speed control device, pivoted foot pedal w. heel-toe ends | | | |
| 54 | 4a | VP | panel to support controls & displays, customizeable size, position & layout | | | |
| 55 | 4b | VM | device to select transmission mode, options presented in Y-pattern | | | |
| 50a | 4a | (traditional truck cab) | windshield outline | | | |
| 50b | 4a | (traditional truck cab) | driver-door window outline | | | |
| 50c | 4a | (traditional truck cab) | driver seat outline | | | |

TABLE 1-continued

| | | | SIVRT Elements, Functions, Specifications and Indicia | | |
|---|---|---|---|---|---|
| Indicia | FIGS. | Form | Function | d, mm  IN | OUT |
| 50d | 4a | (traditional truck cab) | service-brake outline | | |
| 50e | 4a | (traditional truck cab) | dash panel outline | | |
| 50f | 4a | (traditional truck cab) | steering wheel outline | | |

NOTES d = pitch circle diam, mm

*denotes straight, spiral or zerol;

denotes straight or helical

N1 - GEN. FEATURE notation and gears of embodiments of the present invention comply w. ISO 1122, 21771 and others N2 - gear profiles, face width and size-scaling are according to to ISO conventions for the noted material, module and torque range N3 - bore of PA is splined to connect w. shaft C and slidable along C between "in", or "not in", engagement with PB by action of pivoting PSL.

N4 - PSL tip engages a mating groove-like feature in PA to move it laterally along C. The linkage between PA and PB is controlled by PSL N5 - gears 7-14 and 16-18 in model have 18 teeth N3 - bore of PA is splined to connect w. shaft C and slidable along C between "in", or "not in", engagement with PB by action of pivoting PSL.

N6 - gears 1 and 2 are defined by ISO gear-scaling algorithms to provide input speed reduction or increase for application N7 - bevel/spider gear characteristics for each embodiment are defined by ISO gear-scaling algorithms N8 - gears 10 and 12 can be sized as needed to set speed of FCG1 and FCG2, but should both be sized the same N9 - the transverse flow area of the rectangular slot (39) in its open state is comparable to the circular flow areas of (37) and (38); the transverse flow area of all bypass portions is approximately the 0.75 × (addendum + dedendum, in mm) ^2 of the driven gear (31) teeth.

N10 - the dimensional characteristics of the driven (31a) and idler (31b) gears are: 35 < pitch diem, mm < 300; 3 < module, mm < 5; and 20 < face width, mm < 50.

N11 - Plug rotation arc ~90 deg.

The invention claimed is:

1. A geartrain comprising:

an input shaft;

an output shaft;

a first intermediate shaft;

a second intermediate shaft;

a first auxiliary shaft;

a second auxiliary shaft;

a first planetary carrier supported on the input shaft, the first planetary carrier having two or more first planetary gears that engage a first sun gear supported on the first intermediate shaft;

a first ring gear engages the two or more first planetary gears and a first stationary gear supported on the first auxiliary shaft;

a first gear supported on the first intermediate shaft;

a second gear supported on the second intermediate shaft that engages the first gear;

a third gear supported on the second auxiliary shaft that engages the second gear;

a second planetary carrier supported on the output shaft, the second planetary carrier having two or more second planetary gears that engage a second sun gear supported on the first intermediate shaft; and a second ring gear engages the two or more second planetary gears and a second stationary gear supported on the first auxiliary shaft.

2. The geartrain of claim 1, wherein the first ring gear is larger than the second ring gear.

3. The geartrain of claim 1, further comprising:

a first fluid-coupled-gearset coupled to the first auxiliary shaft;

a second fluid-coupled-gearset coupled to the second auxiliary shaft; and wherein the first and second fluid-coupled-gearsets control an output gear ratio of the output shaft to the input shaft and a rotational direction of the output shaft.

4. The geartrain of claim 3, wherein the geartrain operates in:

a neutral setting when no torque feedback is supplied by the first and second fluid-coupled-gearsets;

a forward setting when the torque feedback is supplied by the first fluid-coupled-gearset; and a reverse setting when the torque feedback is supplied by the second fluid-coupled-gearset.

5. The geartrain of claim 1, further comprising an operator interface coupled to the geartrain that stops, starts or reverses the geartrain.

6. The geartrain of claim 1, wherein the geartrain does not include a band-clutch or a disc-clutch.

7. The geartrain of claim 1, further comprising a power source coupled to the input shaft.

8. A method of operating the geartrain comprising:

providing the geartrain of claim 1, the geartrain further comprising a first fluid-coupled-gearset coupled to the first auxiliary shaft and a second fluid-coupled-gearset coupled to the second auxiliary shaft;

turning the output shaft in a same direction of the input shaft by activating the first fluid-coupled-gearset and inactivating the second fluid-coupled-gearset;

turning the output shaft in an opposite direction of the input shaft by inactivating the first fluid-coupled-gearset and activating the second fluid-coupled-gearset; and neutralizing the output shaft by inactivating the first fluid-coupled-gearset and inactivating the second fluid-coupled-gearset.

9. The method of claim 8, wherein the first ring gear is larger than the second ring gear.

10. The method of claim 8, further comprising an operator interface coupled to the geartrain that stops, starts or reverses the geartrain.

11. The method of claim 8, wherein the geartrain does not include a band-clutch or a disc-clutch.

12. The method of claim 8, further comprising a power source coupled to the input shaft.

13. A geartrain system comprising:

a first geartrain;

a second geartrain;

wherein the first geartrain and the second geartrain each comprise:

an input shaft, an output shaft, a first intermediate shaft, a second intermediate shaft, a first auxiliary shaft, a second auxiliary shaft, a first planetary carrier supported on the input shaft, the first planetary carrier having two or more first planetary gears that engage a first sun gear supported on the first intermediate shaft, a first ring gear engages the two or more first planetary gears and a first stationary gear supported on the first auxiliary shaft, a first gear supported on the first intermediate shaft, a second gear supported on the second intermediate shaft that engages the first gear, a third gear supported on the second auxiliary shaft that engages the second gear, a second planetary carrier supported on the output shaft, the second planetary carrier having two or more second planetary gears that engage a second sun gear supported on the first intermediate shaft, and a second ring gear engages the two or more second planetary gears and a second stationary gear supported on the first auxiliary shaft; and a power source coupled to the input shaft of the first geartrain and the input shaft of the second geartrain.

14. The geartrain system of claim 13, wherein the first ring gears of the first and second geartrains are larger than the second ring gears of the first and second geartrains.

15. The geartrain system of claim 13, further comprising:

a first fluid-coupled-gearset coupled to the first auxiliary shaft of the first geartrain and the second geartrain;

a second fluid-coupled-gearset coupled to the second auxiliary shaft of the first geartrain and the second geartrain; and wherein the first and second fluid-coupled-gearsets control an output gear ratio of the output shaft to the input shaft of the first geartrain and the second geartrain and a rotational direction of the output shaft of the first geartrain and the second geartrain.

16. The geartrain system of claim 15, wherein the geartrain system operates in:

a neutral setting when no torque feedback is supplied by the first and second fluid-coupled-gearsets;

a forward setting when the torque feedback is supplied by the first fluid-coupled-gearset; and a reverse setting when the torque feedback is supplied by the second fluid-coupled-gearset.

17. The geartrain system of claim 13, further comprising:

a first fluid-coupled-gearset coupled to the first auxiliary shaft of the first geartrain;

a second fluid-coupled-gearset coupled to the second auxiliary shaft of the first geartrain;

a third fluid-coupled-gearset coupled to the first auxiliary shaft of the second geartrain;

a fourth fluid-coupled-gearset coupled to the second auxiliary shaft of the second geartrain;

wherein the first and second fluid-coupled-gearsets control an output gear ratio of the output shaft to the input shaft of the first geartrain and a rotational direction of the output shaft of the first geartrain; and wherein the third and fourth fluid-coupled-gearsets (FCG3, FCG4) control an output gear ratio of the output shaft to the input shaft of the second geartrain and a rotational direction of the output shaft of the second geartrain.

18. The geartrain system of claim 17, wherein:

the first geartrain operates in a neutral setting when no torque feedback is supplied by the first and second fluid-coupled-gearsets, a forward setting when the torque feedback is supplied by the first fluid-coupledgearset, and a reverse setting when the torque feedback is supplied by the second fluid-coupled-gearset; and the second geartrain operates in the neutral setting when no torque feedback is supplied by the third and fourth fluid-coupled-gearsets, the forward setting when the torque feedback is supplied by the third fluid-coupled-gearset, and the reverse setting when the torque feedback is supplied by the fourth fluid-coupled-gearset.

19. The geartrain system of claim 13, further comprising an operator interface coupled to the geartrain system that stops, starts or reverses the geartrain system.

20. The geartrain system of claim 13, wherein the geartrain system does not include a band-clutch or a disc-clutch.

21. A method of operating the geartrain system comprising:

providing the geartrain system of claim 13, the first geartrain and the second geartrain further comprising a first fluid-coupled-gearset coupled to the first auxiliary shaft and a second fluid-coupled-gearset coupled to the second auxiliary shaft;

turning the output shafts of the first geartrain and the second geartrain in a same direction of the input shaft by activating the first fluid-coupled-gearset and inactivating the second fluid-coupled-gearset;

turning the output shafts of the first geartrain and the second geartrain in an opposite direction of the input shaft by inactivating the first fluid-coupled-gearset and activating the second fluid-coupled-gearset; and neutralizing the output shafts of the first geartrain and the second geartrain by inactivating the first fluid-coupled-gearset and inactivating the second fluid-coupled-gearset.

22. The method of claim 21, wherein the first ring gears of the first and second geartrains are larger than the second ring gears of the first and second geartrains.

23. The method of claim 21, further comprising an operator interface coupled to the first geartrain and second geartrain that stops, starts or reverses the geartrain system.

24. The method of claim 21, wherein the geartrain system does not include a band-clutch or a disc-clutch.

25. A method of operating the geartrain system comprising:

providing the geartrain system of claim 13, further comprising a first fluid-coupled-gearset coupled to the first auxiliary shaft of the first geartrain, a second fluid-coupled-gearset coupled to the second auxiliary shaft of the first geartrain, a third fluid-coupled-gearset coupled to the first auxiliary shaft of the second geartrain, and a fourth fluid-coupled-gearset coupled to the second auxiliary shaft of the second geartrain;

turning the output shaft in a same direction of the input shaft of the first geartrain by activating the first fluid-coupled-gearset and inactivating the second fluid-coupled-gearset;

turning the output shaft in an opposite direction of the input shaft of the first geartrain by inactivating the first fluid-coupled-gearset and activating the second fluid-coupled-gearset;

neutralizing the output shaft of the first geartrain by inactivating the first fluid-coupled-gearset and inactivating the second fluid-coupled-gearset;

turning the output shaft in a same direction of the input shaft of the second geartrain by activating the third fluid-coupled-gearset and inactivating the fourth fluid-coupled-gearset;

turning the output shaft in an opposite direction of the input shaft of the second geartrain by inactivating the third fluid-coupled-gearset and activating the fourth fluid-coupled-gearset; and neutralizing the output shaft of the second geartrain by inactivating the third fluid-coupled-gearset and inactivating the fourth fluid-coupled-gearset.

26. The method of claim 25, wherein the first ring gears of the first and second geartrains are larger than the second ring gears of the first and second geartrains.

27. The method of claim 25, further comprising an operator interface coupled to the first geartrain and second geartrain that stops, starts or reverses the geartrain system.

28. The method of claim 25, wherein the geartrain system does not include a band-clutch or a disc-clutch.

\* \* \* \* \*